US010057553B2

(12) United States Patent
Akiyama

(10) Patent No.: US 10,057,553 B2
(45) Date of Patent: Aug. 21, 2018

(54) LIGHT SOURCE DEVICE, ILLUMINATION DEVICE, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/172,770

(22) Filed: Jun. 3, 2016

(65) Prior Publication Data

US 2016/0373704 A1    Dec. 22, 2016

(30) Foreign Application Priority Data

Jun. 19, 2015  (JP) ................. 2015-123750
Jul. 28, 2015  (JP) ................. 2015-148282

(51) Int. Cl.
*G03B 21/20* (2006.01)
*H04N 9/31* (2006.01)
(Continued)

(52) U.S. Cl.
CPC ....... *H04N 9/3152* (2013.01); *G02B 27/0905* (2013.01); *G02B 27/0966* (2013.01); *G02B 27/141* (2013.01); *G03B 21/208* (2013.01); *H04N 9/3105* (2013.01); *H04N 9/3138* (2013.01); *H04N 9/3161* (2013.01)

(58) Field of Classification Search
CPC . G02B 27/30; G02B 3/06; G02B 5/04; G02B 19/00; H04N 9/31; H04N 5/74; F21S 2/00; G03B 21/20; G03B 21/14; F21V 5/00; F21V 5/04; G02F 1/13
See application file for complete search history.

(56) References Cited

U.S. PATENT DOCUMENTS 5,418,583 A * 5/1995 Masumoto ........... G02B 3/0031
                                              348/E9.027
2008/0019010 A1 * 1/2008 Govorkov .......... B23K 26/0613
                                                      359/641
(Continued)

FOREIGN PATENT DOCUMENTS

CN    102141723 A    8/2011
JP    2009-025512 A   2/2009
(Continued)

*Primary Examiner* — Sultan Chowdhury
*Assistant Examiner* — Danell L Owens
(74) *Attorney, Agent, or Firm* — Oliff PLC

(57) ABSTRACT

A light source device includes a light source array including at least one light emitting part, a collimating optical system that receives a light beam bundle emitted from the light source array, a first lens array including a plurality of first small lenses that receives the light beam bundle having passed through the collimating optical system, and a second lens array that is disposed in a subsequent stage of the first lens array and includes a plurality of second small lenses corresponding respectively to the first small lenses. The planar shape of the light emission area of the light emitting part has a short-side direction and a longitudinal direction. The planar shape of the second small lens has a longitudinal direction. The short-side direction of the light emission area crosses the longitudinal direction of the second small lens.

18 Claims, 12 Drawing Sheets

(51) Int. Cl.
*G02B 27/09* (2006.01)
*G02B 27/14* (2006.01)

(56) References Cited

U.S. PATENT DOCUMENTS

| | | | |
|---|---|---|---|
| 2009/0021700 | A1 | 1/2009 | Matsumoto |
| 2010/0231862 | A1 | 9/2010 | Itoh et al. |
| 2011/0187999 | A1 | 8/2011 | Hirata et al. |
| 2012/0133904 | A1* | 5/2012 | Akiyama ............ G02B 27/102 |
| | | | 353/38 |
| 2013/0010215 | A1 | 1/2013 | Taketsu et al. |
| 2013/0135593 | A1* | 5/2013 | Saitou .................. G03B 21/204 |
| | | | 353/31 |
| 2014/0152962 | A1 | 6/2014 | Hirata et al. |
| 2015/0124225 | A1 | 5/2015 | Akiyama |

FOREIGN PATENT DOCUMENTS

| | | |
|---|---|---|
| JP | 2009-192789 A | 8/2009 |
| JP | 2012-063488 A | 3/2012 |
| JP | 2012-118110 A | 6/2012 |
| JP | 2012-118302 A | 6/2012 |
| JP | 2013-015762 A | 1/2013 |
| JP | 2013-114980 A | 6/2013 |
| JP | 2014-235896 A | 12/2014 |
| JP | 2015-090489 A | 5/2015 |
| WO | 07/108504 A1 | 9/2007 |

\* cited by examiner

LIGHT SOURCE DEVICE, ILLUMINATION DEVICE, AND PROJECTOR

BACKGROUND

1. Technical Field

The present invention relates to a light source device, an illumination device, and a projector.

2. Related Art

Projectors are devices for modulating light emitted from a light source part in accordance with image information using a light modulation device, and then projecting the image thus obtained in an enlarged manner using a projection lens. In recent years, a solid-state light source such as a semiconductor laser, with which high-intensity and high-power light can be obtained, attracts attention as a light source of a light source device used for such a projector.

In JP-A-2013-15762 (Document 1), there is disclosed an illumination device for a projector, provided with an array light source having a plurality of semiconductor lasers arranged two-dimensionally, a pair of cylindrical lenses for collimating a light beam bundle of light emitted from the array light source, and an integrator optical system for homogenizing the illumination light.

In JP-A-2012-118110 (Document 2), there is disclosed a light source device using a lens integrator in order to evenly illuminate the phosphor layer with the light from the array light source composed of the plurality of semiconductor lasers.

When mounting the solid-state light source, it is inevitable that some variation (mounting variation) occurs in alignment. However, in the illumination device described in Document 1 and the light source device described in Document 2, since the mounting variation of the solid-state light source is not taken into consideration, there is a problem that the light emitted from the solid-state light source is not efficiently used, and thus the light use efficiency decreases.

SUMMARY

An advantage of some aspects of the invention is to provide a light source device high in light use efficiency. Another advantage of some aspects of the invention is to provide an illumination device equipped with the light source device. Still another advantage of some aspects of the invention is to provide a projector equipped with the illumination device.

According to a first aspect of the invention, there is provided a light source device including a light source array including at least one light emitting part, a collimating optical system, to which a light beam bundle emitted from the light source array is input, a first lens array including a plurality of first small lenses, to which the light beam bundle having been transmitted through the collimating optical system is input, and a second lens array disposed in a subsequent stage of the first lens array, and including a plurality of second small lenses corresponding respectively to the first small lenses, wherein a planar shape of a light emission area of one of the at least one light emitting part has a short-side direction and a longitudinal direction, a planar shape of one of the second small lenses has a longitudinal direction, and the short-side direction of the light emission area crosses the longitudinal direction of the second small lens.

In the specification, the light emitting part is referred to as a light emitting element in some cases. According to this configuration, the short-side direction of the light emission area crosses the longitudinal direction of the second small lens. Thus, even in the case in which, for example, the mounting error of the light emitting element occurs, the secondary light source image of the light emitted from the light emitting element is unlikely to run off the second small lens. Therefore, high light use efficiency can be obtained.

In the first aspect of the invention described above, the at least one light emitting part may include a plurality of light emitting parts, the light source array may further include a mounting board having a mounting surface on which the plurality of light emitting parts is mounted, the light emitting parts may be mounted along a first direction parallel to the mounting surface so that a principal ray of the light beam bundle is emitted from the light source array in parallel to the mounting surface, the longitudinal direction of each of the light emitting parts may coincide with the first direction, and the longitudinal direction of the second small lens may be parallel to the mounting surface.

According to this configuration, the longitudinal direction of each of the light emitting parts and the longitudinal direction of the second small lenses are set to be parallel to the mounting surface. Thus, even in the case in which, for example, the mounting error of the light emitting part occurs, the secondary light source image of the light emitted from the light emitting part is unlikely to run off the second small lens. Further, since the plurality of light emitting parts is mounted on the mounting surface, the mounting error is difficult to occur in the normal direction of the mounting surface.

Therefore, since the light beam bundle emitted from the light source array efficiently enters the optical member disposed in the subsequent stage of the second lens array, high light use efficiency can be obtained.

The first aspect of the invention described above may be configured such that the collimating optical system includes a first cylindrical lens and a second cylindrical lens disposed in a subsequent stage of the first cylindrical lens, the first cylindrical lens has a first generatrix, the second cylindrical lens has a second generatrix, the first generatrix is parallel to the mounting surface, and a direction of the second generatrix crosses the mounting surface.

According to this configuration, it is possible to collimate the light emitted from each of the light emitting parts using the first cylindrical lens and the second cylindrical lens. Further, the first cylindrical lens has the refractive power in a direction perpendicular to the mounting surface, and the second cylindrical lens has the refractive power in another direction. Further, since the second cylindrical lens is disposed in the subsequent stage of the first cylindrical lens, the focal distance of the second cylindrical lens is longer than the focal distance of the first cylindrical lens. Therefore, even in the case in which the mounting error of the light emitting parts occurs in the first direction, the influence of the mounting error is relatively small.

The first aspect of the invention described above may be configured such that the light beam bundle includes a light beam emitted from one of the light emitting parts, and a distance between the first cylindrical lens and the second cylindrical lens, a refractive power of the first cylindrical lens, and a refractive power of the second cylindrical lens are set so that an aspect ratio of a cross-section of the light beam having been transmitted through the second cylindrical lens is approximately 1.

According to this configuration, the cross-sectional area of the light beam can be increased. Thus, the light beam enters the small lenses of the first lens array in good condition. Therefore, it is possible for the homogenizer optical system to homogenize the light beam bundle emitted from the light source array in good condition.

Further, it is possible to illuminate the illumination target area with the high homogeneity without decreasing the size of each of the small lenses constituting the first lens array and the second lens array.

The first aspect of the invention described above may be configured such that a cross-sectional shape of the first cylindrical lens, perpendicular to the first generatrix, is aspheric.

According to this configuration, even in the case in which the spread angle of the light having been emitted from the light emitting part is large, the collimation can be achieved by the first cylindrical lens in good condition.

The cross-sectional shape may be a shape with a conic constant KC approximated in −1<KC<0.

According to this configuration, since the spherical aberration can be corrected in good condition, even in the case in which the spread angle of the light emitted from the light emitting part is large, the collimation is achieved in good condition by the first cylindrical lens.

In the first aspect of the invention described above, the light source device may further include a light collection optical system disposed in a subsequent stage of the second lens array, and a scattered light generation part which is disposed in a subsequent stage of the light collection optical system, and in which the light beam bundle is input.

According to this configuration, since the light having been emitted from the light emitting element efficiently enters the scattered light generation section, the high light use efficiency can be obtained.

In the first aspect of the invention described above, the light source device may further include a deflection prism disposed on one of a light incident side and a light emission side of the first lens array. A size of the second small lens in the longitudinal direction may be larger than a size of the first small lens out of the plurality of first small lenses in the longitudinal direction, the first small lens corresponding to the second small lens.

According to this configuration, it is possible to adjust the forming position of the secondary light source image on the second small lens using the deflection prism. Further, since the size in the longitudinal direction of the second small lens is larger than the size in the longitudinal direction of the first small lens, the run-off of the secondary light source image on the second small lens can be controlled.

In the first aspect of the invention described above, it is preferable that a deflection direction by the deflection prism of the light emitted from the light emitting part is the longitudinal direction of the second small lens, and the deflection direction is a direction of getting away from an optical axis of the light beam bundle.

According to this configuration, it is possible to control the run-off of the secondary light source image on each of the second small lenses arranged in the direction of getting away from the optical axis of the light beam bundle.

In the first aspect of the invention described above, it is preferable that the deflection prism has a strip shape elongated in a direction perpendicular to the longitudinal direction of the second small lens.

According to this configuration, since the deflection prism having the strip shape can be used in common by a plurality of first small lenses in the short-side direction of the second small lens, the number of components can be reduced.

In the first aspect of the invention described above, it is preferable that an optical axis of one of the first small lenses is eccentrically disposed in the longitudinal direction of the second small lens, and the eccentric direction is a direction of getting away from an optical axis of the light beam bundle.

According to this configuration, the run-off of the secondary light source image on the second small lenses can be controlled using the first small lenses without using the optical element such as a deflection prism.

In the first aspect of the invention described above, it is preferable that an optical axis of the second small lens is eccentrically disposed in the longitudinal direction of the second small lens, and the eccentric direction is a direction of getting closer to an optical axis of the light beam bundle. In this case, it is desirable that a center of the first small lens corresponding to the second small lens out of the plurality of first small lenses is located on an optical axis of the second small lens.

According to this configuration, it is possible to make the parallel light enter the light collection optical system from the second small lens.

According to a second aspect of the invention, there is provided an illumination device including the light source device according to the first aspect described above, and a homogenous illumination optical system to which light emitted from the light source device is input.

The illumination device according to the second aspect is equipped with the light source device described above, and is therefore high in light use efficiency.

According to a third aspect of the invention, there is provided a projector including the illumination device according the second aspect described above, a light modulation device adapted to modulate, in accordance with image information, light emitted from the illumination device to thereby form image light, and a projection optical system adapted to project the image light.

The projector according to the third aspect is equipped with the illumination device described above, and is therefore high in light use efficiency.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be described in detail with reference to the accompanying drawings.

It should be noted that the drawings used in the following description show characteristic parts in an enlarged manner in some cases in order to make the characteristics easy to understand, and the dimensional ratios between the constituents and so on are not necessarily the same as actual ones.
First Embodiment
Projector Firstly, an example of the projector 1 shown in FIG. 1 will be described.

Figure 1:
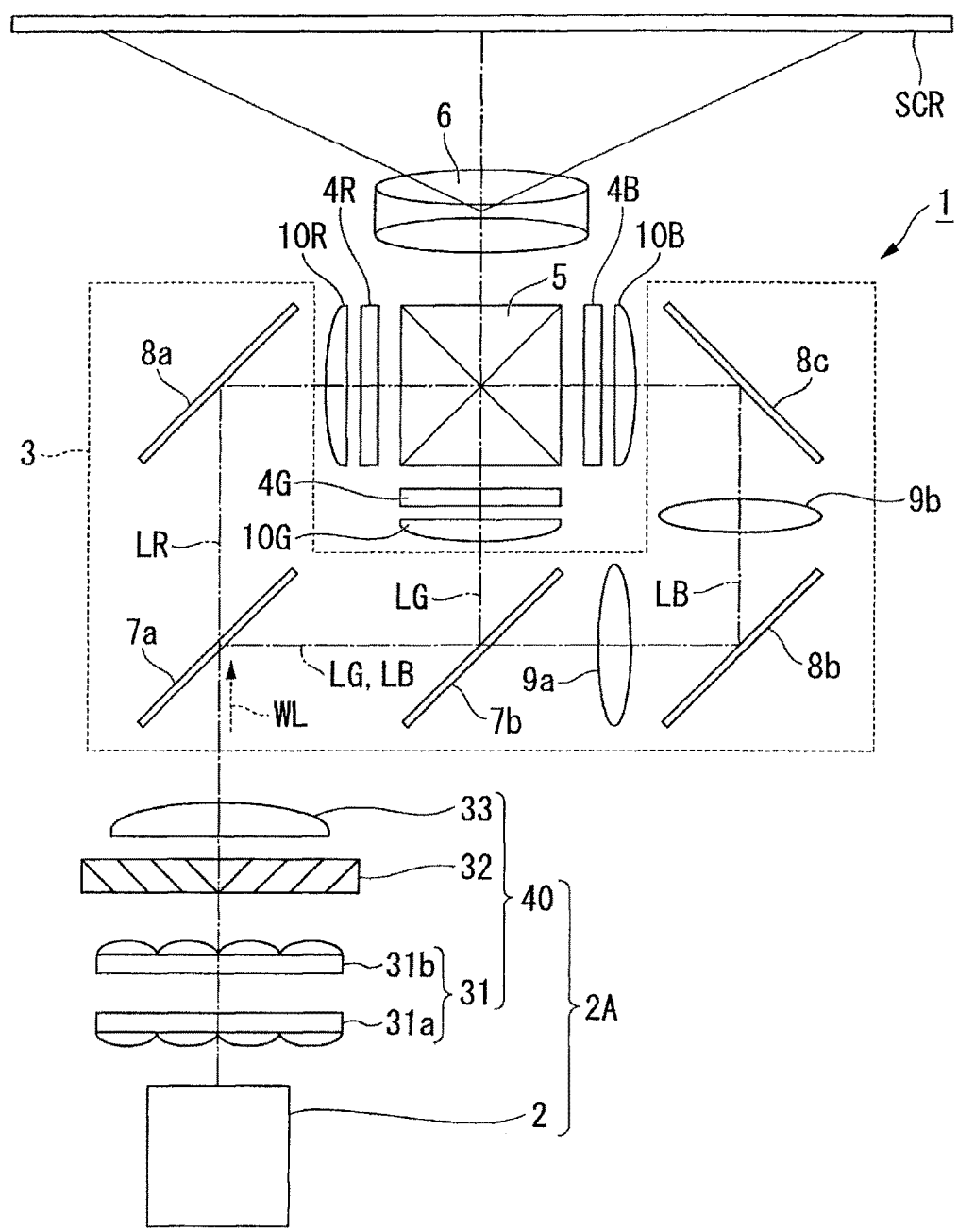
FIG. 1 is a plan view showing a schematic configuration of a projector according to a first embodiment of the invention.

FIG. 1 is a plan view showing a schematic configuration of the projector 1.

The projector 1 according to the present embodiment is a projection-type image display device for displaying a color picture (image) on a screen (a projection target surface) SCR. The projector 1 uses three light modulation devices corresponding respectively to colored light, namely red light LR, green light LG, and blue light LB. The projector 1 uses semiconductor lasers (laser sources), with which high-intensity and high-power light can be obtained, as light sources of an illumination device.

Specifically, as shown in FIG. 1, the projector 1 is generally provided with the illumination device 2A, a color separation optical system 3, a light modulation device 4R, a light modulation device 4G, a light modulation device 4B, a combining optical system 5, and a projection optical system 6.

The illumination device 2A emits white light WL as illumination light toward the color separation optical system 3. The illumination device 2A includes a light source device 2 and a homogenous illumination optical system 40.

The homogenous illumination optical system 40 is provided with a first integrator optical system 31, a polarization conversion element 32, and an overlapping optical system 33. It should be noted that the polarization conversion element 32 is not essential. The homogenous illumination optical system 40 homogenizes the intensity distribution of the white light WL emitted from the light source device 2 in an illumination target area. The white light WL having been emitted from the homogenous illumination optical system 40 enters the color separation optical system 3.

The color separation optical system 3 is for separating the white light WL into the red light LR, the green light LG, and the blue light LB. The color separation optical system 3 is generally provided with a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a has a function of separating the white light WL from the light source device 2 into the red light LR and the rest of the light (the green light LG and the blue light LB). The first dichroic mirror 7a transmits the red light LR thus separated, and at the same time reflects the rest of the light (the green light LG and the blue light LB). Meanwhile, the second dichroic mirror 7b has a function of separating the rest of the light into the green light LG and the blue light LB. The second dichroic mirror 7b reflects the green light LG thus separated, while transmitting the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB, and reflect the blue light LB, which has been transmitted through the second dichroic mirror 7b, toward the light modulation device 4B. It should be noted that it is not necessary to dispose a total reflection mirror in the light path of the green light LG, and the green light LG is reflected by the second dichroic mirror 7b toward the light modulation device 4G.

The first relay lens 9a and the second relay lens 9b are disposed on the light emission side of the second dichroic mirror 7b in the light path of the blue light LB. The first relay lens 9a and the second relay lens 9b have a function of compensating the optical loss of the blue light LB due to the fact that the optical path length of the blue light LB becomes longer than the optical path lengths of the red light LR and the green light LG.

The light modulation device 4R modulates the red light LR in accordance with image information to form image light corresponding to the red light LR while transmitting the red light LR. The light modulation device 4G modulates the green light LG in accordance with the image information to form image light corresponding to the green light LG while transmitting the green light LG. The light modulation device 4B modulates the blue light LB in accordance with the image information to form image light corresponding to the blue light LB while transmitting the blue light LB.

As the light modulation device 4R, the light modulation device 4G, and the light modulation device 4B, there are used, for example, transmissive liquid crystal panels. Further, on the incident side and the exit side of the liquid crystal panel, there are disposed a pair of polarization plates (not shown), respectively, and thus there is formed a configuration of transmitting only the linearly polarized light with a specific direction.

On the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B are for collimating the red light LR, the green light LG, and the blue light LB entering the light modulation device 4R, the light modulation device 4G, and the light modulation device 4B, respectively.

The combining optical system 5 combines the image light corresponding to the red light LR, the green light LG, and the blue light LB in response to the entrance of the image light from the light modulation device 4R, the light modulation device 4G, and the light modulation device 4B, respectively, and then emits the image light thus combined toward the projection optical system 6. As the combining optical system 5, there is used, for example, a cross dichroic prism.

The projection optical system 6 is formed of a projection lens group. The projection optical system 6 projects the image light combined by the combining optical system 5 toward the screen SCR in an enlarged manner. Thus, a color picture (image) thus enlarged is displayed on the screen SCR.

Light Source Device

Then, a specific example of the light source device according to the embodiment, to which one of the aspects of the invention is applied, used for the illumination device 2A described above will be described. Each of the constituents of the light source device will hereinafter be described using an XYZ coordinate system if needed.

Figure 2:
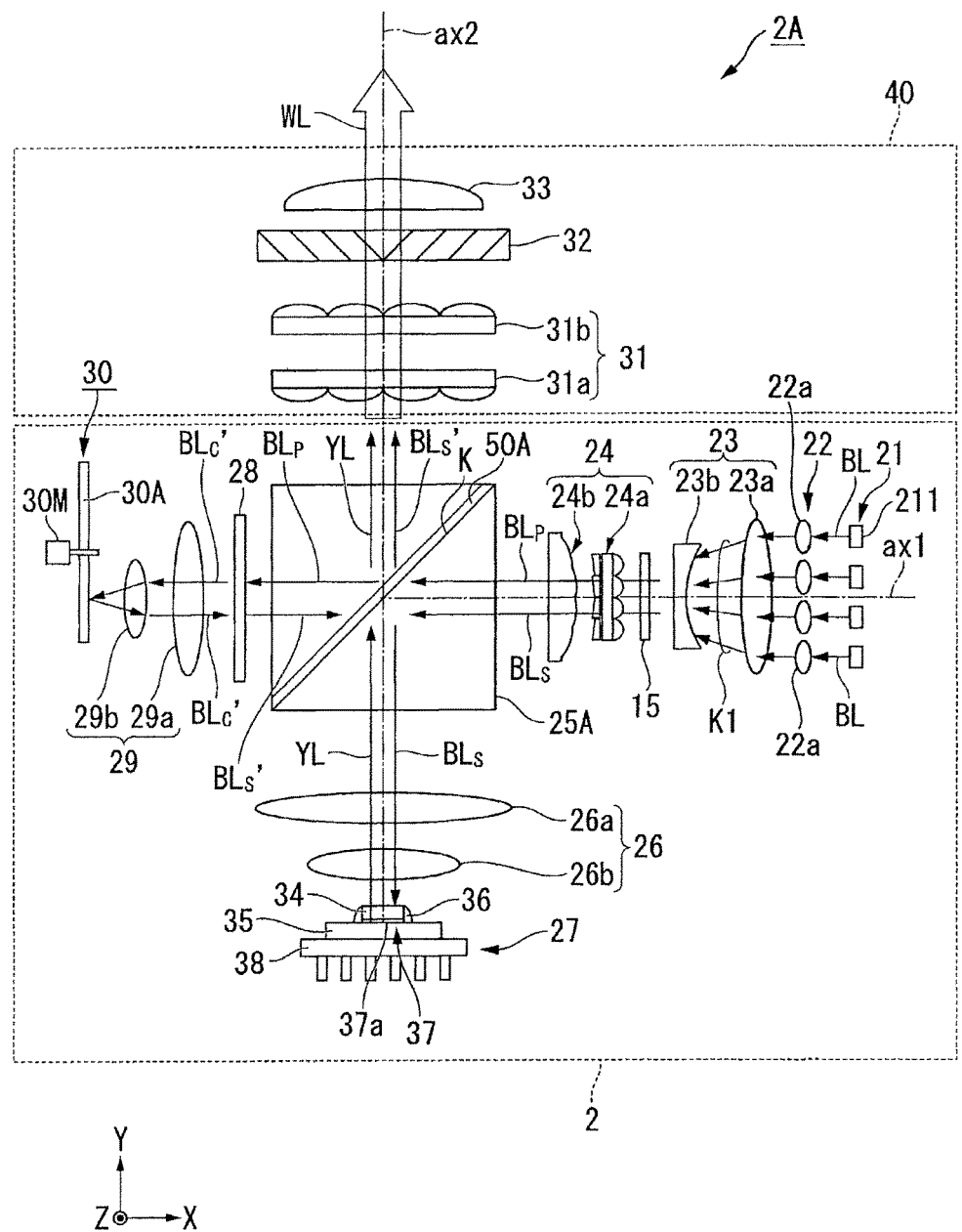
FIG. 2 is a plan view showing a general configuration of a light source device according to the first embodiment.

FIG. 2 is a plan view showing a general configuration of the light source device 2. It should be noted that in FIG. 2, the X direction is a direction parallel to the optical axis ax1, the Y direction is a direction parallel to the optical axis ax2 perpendicular to the optical axis ax1, and the Z direction is a direction perpendicular to the X direction and the Y direction.

As shown in FIG. 2, the light source device 2 is generally provided with an array light source 21, a collimating optical system 22, an afocal optical system 23, a first wave plate 15, a homogenizer optical system 24, an optical element 25A including a polarization separation element 50A, a first light collection optical system 26, a fluorescence emitting element 27, a second wave plate 28, a second light collection optical system 29, and a diffusely reflecting element 30.

The fluorescence emitting element 27 or the diffusely reflecting element 30 of the present embodiment corresponds to a "scattered light generation part" in the appended claims.

Among these constituents, the array light source 21, the collimating optical system 22, the afocal optical system 23, the first wave plate 15, the homogenizer optical system 24, the optical element 25A, the second wave plate 28, the second light collection optical system 29, and the diffusely reflecting element 30 are disposed on the optical axis ax1 sequentially side by side. In contrast, the fluorescence emitting element 27, the first light collection optical system 26, and the optical element 25A are disposed on the optical axis ax2 sequentially side by side. The optical axis ax1 and the optical axis ax2 are located in the same plane, and have a positional relationship of being perpendicular to each other.

The array light source 21 is provided with a plurality of semiconductor lasers 211 as solid-state light sources. The plurality of semiconductor lasers 211 is disposed in the same plane perpendicular to the optical axis ax1 arranged in an array. The semiconductor lasers 211 each emit, for example, a blue ray BL (e.g., a laser beam with a peak wavelength of 460 nm). In the present embodiment, the array light source 21 emits a light beam bundle K1 formed of a plurality of rays BL. The semiconductor lasers 211 correspond to a "light emitting part" in the appended claims. The array light source 21 corresponds to a "light source array" in the appended claims.

Figure 3:
FIG. 3 is a planar view of a light exit area of a semiconductor laser of the first embodiment.

FIG. 3 is a planar view of the light emission area of the semiconductor laser 211. As shown in FIG. 3, the light emission area 211A of the semiconductor laser 211 has, for example, a roughly rectangular planar shape having a longitudinal direction and a short-side direction. The longitudinal direction of the light emission area 211A corresponds to a direction along the optical axis ax2 (the Y direction) shown in FIG. 2. Further, the short-side direction of the light emission area 211A corresponds to a direction along the Z direction.

Going back to FIG. 2, the light beam bundle K1 having been emitted from the array light source 21 enters the collimating optical system 22. The collimating optical system 22 is for converting the light beam bundle K1 having been emitted from the array light source 21 into parallel light. The collimating optical system 22 is formed of, for example, a plurality of collimator lenses 22a arranged side by side in an array. The collimator lenses 22a are disposed so as to correspond respectively to the semiconductor lasers 211.

The light beam bundle K1 having been transmitted through the collimating optical system 22 enters the afocal optical system 23. The afocal optical system 23 is for adjusting the light beam diameter of the light beam bundle K1. The afocal optical system 23 is formed of, for example, a convex lens 23a and a concave lens 23b.

The light beam bundle K1 having been transmitted through the afocal optical system 23 enters the first wave plate 15. The first wave plate 15 is, for example, a half-wavelength plate arranged to be able to rotate. The ray BL emitted from the semiconductor laser 211 is linearly polarized light. By appropriately setting the rotational angle of the half-wavelength plate, it is possible to set the ray BL having been transmitted through the first wave plate 15 to the light (the light beam bundle K1) including the S-polarization component and the P-polarization component with respect to the optical element 25A at a predetermined ratio. By rotating the first wave plate 15, the ratio between the S-polarization component and the P-polarization component can be changed.

The light beam bundle K1, which has been transmitted through the first wave plate 15, and thus includes a ray BLs of the S-polarization component and a ray BLp of the P-polarization component, enters the homogenizer optical system 24. The homogenizer optical system 24 homogenizes the illuminance distribution by the ray BLs on a phosphor layer 34 in cooperation with the first light collection optical system 26. Further, the homogenizer optical system 24 homogenizes the illuminance distribution by a ray BLc' on the diffusely reflecting plate 30A described later in cooperation with the second light collection optical system 29. The homogenizer optical system 24 is formed of, for example, a first lens array 24a and a second lens array 24b. The first lens array 24a includes a plurality of first small lenses 24am, and the second lens array 24b includes a plurality of second small lenses 24bm. The second small lenses 24bm correspond respectively to the first small lenses 24am.

The first lens array 24a (the first small lenses 24am) and one of the fluorescence emitting element 27 and the diffusely reflecting element 30 are disposed at positions to optically be conjugate with each other. Further, the light emission area 211A of the semiconductor laser 211 and the second lens array 24b are disposed at positions to optically be conjugate with each other.

Incidentally, in the light source device 2 provided with the semiconductor lasers 211 arranged in an array and the collimator lenses 22a arranged in an array as in the present embodiment, it is inevitable that some displacement occurs in the alignment of the semiconductor lasers 211 or the collimator lenses 22a. In other words, in the present embodiment, the light source device 2 is arranged to have some mounting error.

Here, advantages of the light source device 2 according to the present embodiment will be described with reference to a comparative example.

Figure 4:
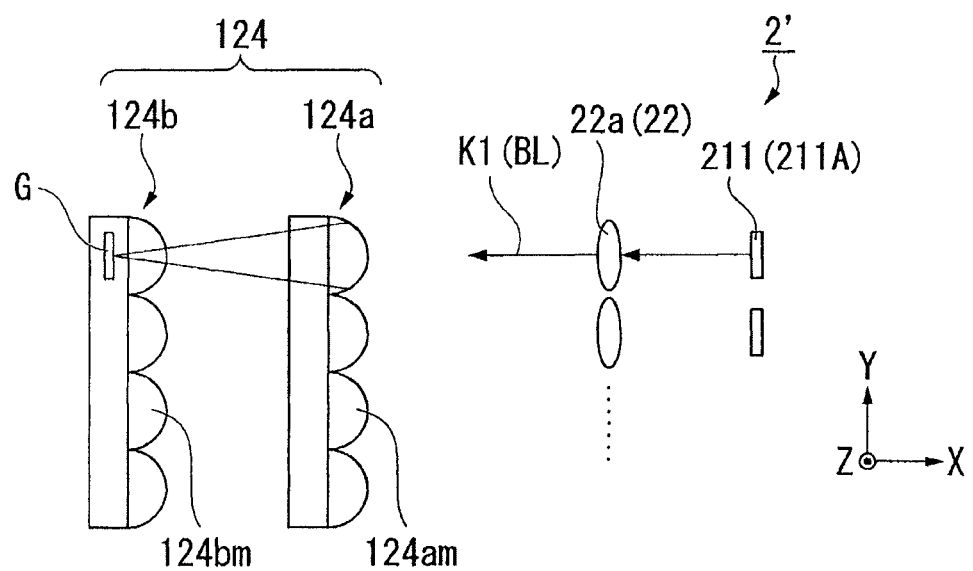
FIG. 4 is a diagram showing a configuration of an essential part of a light source device according to a comparative example.

FIG. 4 is a diagram showing a configuration of an essential part of a display device 2' according to the comparative example. It should be noted that FIG. 4 shows the same configuration as that of the light source device 2 according to the present embodiment except that point that the homogenizer optical system 24 is replaced with a homogenizer optical system 124. FIG. 4 only shows the homogenizer optical system 124, the array light source 21, and the collimator lenses 22a.

The homogenizer optical system 124 is provided with a first lens array 124a including a plurality of first small lenses 124am, and a second lens array 124b including a plurality of second small lenses 124bm.

In the homogenizer optical system 124, if the mounting error described above occurs, the homogeneity of the illuminance distribution by the ray BLs on the phosphor layer 34 degrades. This is because the position of a secondary light source image G formed on the second small lens 124bm by the ray BL emitted from the light emission area 211A is shifted from a predetermined position of the second small lens 124bm.

In the case in which the planar shape of the light emission area 211A is the shape (e.g., a rectangle) having a longitudinal direction in the Y direction as described above, the secondary light source image G formed on the second small lens 124bm having the optically conjugate relationship has a shape (a rectangular shape) having the longitudinal direction in the Y direction.

Here, the displacement of the secondary light source image on the second small lens 124bm due to the mounting error occurs in every direction at the same rate.

Figure 5A:
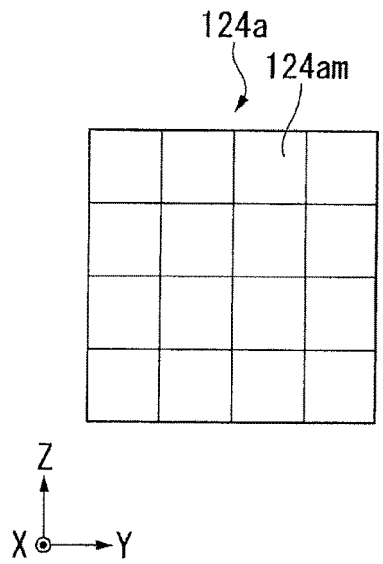
FIGS. 5A and 5B are plan views of first and second lens arrays of the comparative example, respectively.
Figure 5B:
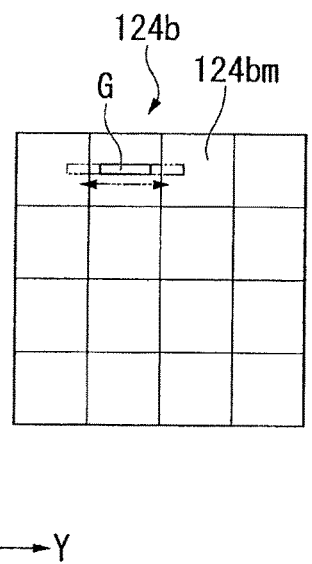

FIG. 5A is a plan view of the first lens array 124a viewed from the +X direction, and FIG. 5B is a plan view of the second lens array 124b viewed from the +X direction.

As shown in FIGS. 5A and 5B, in the homogenizer optical system 124, the size of the first small lens 124am is arranged to be the same as the size of the second small lens 124bm. Specifically, the planar shape of the first small lens 124am and the planar shape of the second small lens 124bm are both squares each having the length in the Y direction and the length in the Z direction equal to each other.

If the mounting error occurs, the secondary light source image G is shifted from the predetermined position. As is understood from FIG. 5B, the secondary light source image G is easier to run off the second small lens 124bm in the case in which the secondary light source image G is shifted in the longitudinal direction (the Y direction) of the light emission area 211A than in the case of being shifted in the Z direction. If the secondary light source image G runs off the second small lens 124bm, the light from the array light source 21 cannot efficiently be used, and thus the light use efficiency degrades.

In order to solve this problem, the light source device 2 according to the present embodiment is provided with the homogenizer optical system 24 including the second small lenses 24bm each having a rectangular planar shape having a longitudinal direction and a short-side direction.

Figure 6A:
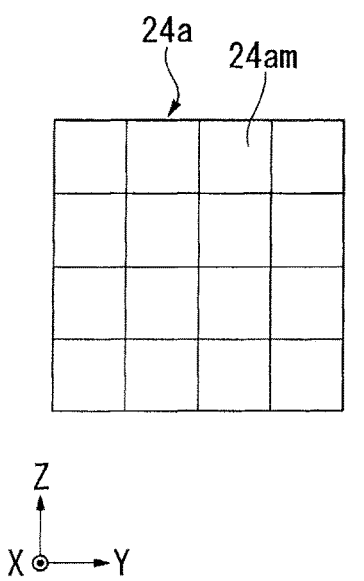
FIGS. 6A and 6B are plan views of first and second lens arrays of the first embodiment, respectively.
Figure 6B:
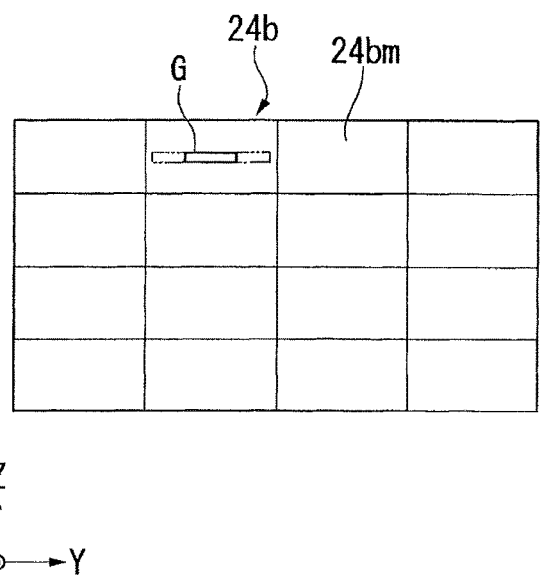

FIG. 6A is a plan view of the first lens array 24a viewed from the +X direction, and FIG. 6B is a plan view of the second lens array 24b viewed from the +X direction.

As shown in FIG. 6A, the planar shape of the first small lens 24am of the first lens array 24a is a square having the length in the Y direction and the length in the Z direction equal to each other.

In contrast, as shown in FIG. 6B, the planar shape of the second small lens 24bm of the second lens array 24b is a rectangle (oblong) having a long side along the Y direction and a short side along the Z direction. As described above, in the present embodiment, the size in the longitudinal direction (the Y direction) of the second small lens 24bm is arranged to be larger than the size in the Y direction of the first small lens 24am.

Figure 7A:
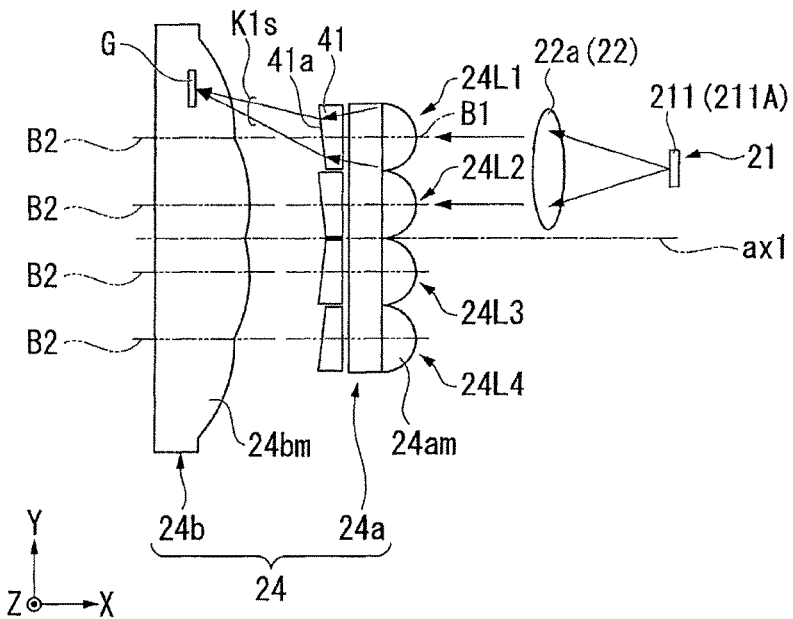
FIGS. 7A and 7B are configuration diagram of an essential part of a homogenizer optical system of the first embodiment.
Figure 7B:
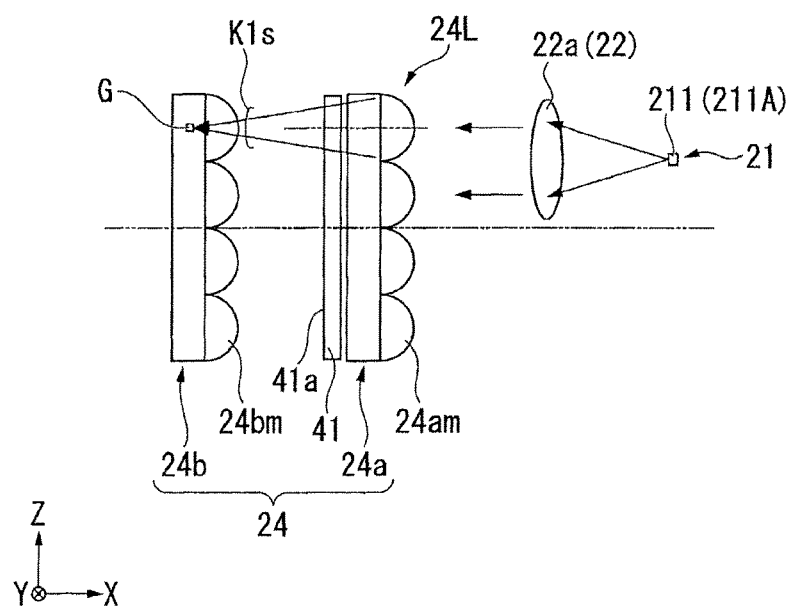

FIGS. 7A and 7B are diagrams showing a configuration of an essential part of the homogenizer optical system 24, wherein FIG. 7A is a plan view of the homogenizer optical system 24 viewed from the +Z direction, and FIG. 7B is a side view of the homogenizer optical system 24 viewed from the −Y direction.

In the present embodiment, a plurality of deflection prisms 41 is disposed on the light emission side of the first small lenses 24am. As shown in FIG. 7A, the deflection prisms 41 are respectively disposed in lens columns 24L1, 24L2, 24L3, and 24L4 each formed of a plurality of first small lenses 24am arranged in the Z direction.

As shown in FIG. 7B, the deflection prisms 41 each have a strip shape elongated in the short-side direction (the Z direction) of the second small lens 24bm. Therefore, in each of the lens columns 24L1, 24L2, 24L3, and 24L4 (collectively referred to as lens columns 24L), one deflection prism 41 is disposed with respect to a plurality of (e.g., four in the present embodiment) first small lenses 24am. By using one deflection prism 41 with respect to the plurality of first small lenses 24am, the number of components can be reduced.

The deflection prism 41 is provided with a prism surface 41a having a deflection property for changing a proceeding direction of the light (light K1s which is a part of the light beam bundle K1) disposed on the second small lens 24bm side. The deflection direction by the prism surface 41a is the longitudinal direction (the Y direction) of the second small lens 24bm, and specifically, a direction of getting away from the optical axis ax1.

The deflection prism 41 deflects the light K1s toward the direction (the Y direction or the −Y direction) of getting away from the optical axis ax1. It should be noted that the distance between the imaging position of the light K1s emitted from the first small lens 24am and the plane in which the plurality of first small lenses 24am is disposed does not change. The distance between the first lens array 24a and the second lens array 24b is adjusted so as not to disturb the conjugate relation existing between the first small lenses 24am and one of the fluorescence emitting element 27 and the diffusely reflecting element 30. In the present embodiment, the deflection prism 41 is designed to form the secondary light source image G in the central part of the second small lens 24bm corresponding to the first small lens 24am having emitted the light K1s in the case of assuming that there is no mounting error.

The second small lenses 24bm are each formed of an eccentric lens having an eccentric optical axis.

Specifically, the second small lens 24bm has the optical axis B2 eccentrically disposed in the longitudinal direction (the Y direction) of the second small lens 24bm as shown in FIG. 7A. The eccentric direction of the optical axis B2 is set to a direction of getting closer to the optical axis ax1 of the light emitted from the array light source 21.

In the present embodiment, an optical axis B1 of the first small lens 24am is located on the optical axis B2 of the second small lens 24bm. Thus, it is possible for the second small lens 24bm to convert the light K1s having been emitted from the first small lens 24am into parallel light and then emit the parallel light.

In the present embodiment, the short-side direction (the Z direction) of the light emission area 211A is perpendicular (crossing) to the longitudinal direction (the Y direction) of the second small lens 24bm. In other words, the longitudinal direction (the Y direction) of the light emission area 211A coincides with the longitudinal direction (the Y direction) of the second small lens 24bm.

The longitudinal direction of the secondary light source image G formed on the second small lens 24bm and the longitudinal direction of the second small lens 24bm roughly coincide with each other. Further, since the deflection prism 41 is provided, the secondary light source image G is formed at a predetermined position, for example, the central part in the second small lens 24bm.

In the present embodiment, the size in the Y direction of the second small lens 24bm is larger than the size in the Z direction of the second small lens 24bm. Therefore, even if the secondary light source image G is shifted in the Y direction, in which the run-off easily occurs in the related art, the secondary light source image G is difficult to run off the second small lens 24bm, and thus, the secondary light source image G is formed on the second small lens 24bm in good condition. Therefore, the light from the array light source 21 can efficiently be used. Further, since such high mounting accuracy as ever before is not required, manufacturing becomes easy, and thus, cost reduction can be achieved.

It should be noted that the light K1s emitted from each of the second small lenses 24bm is parallel light as described above, and is therefore converged on the fluorescence emitting element 27 or the diffusely reflecting element 30 via the first light collection optical system 26 or the second collection optical system 29 in good condition.

The optical element 25A is formed of, for example, a dichroic prism having wavelength selectivity. The dichroic prism has a tilted surface K having an angle of 45° with the optical axis ax1. The tilted surface K also has an angle of 45° with the optical axis ax2. The optical element 25A is disposed so that the intersection between the optical axes ax1, ax2 perpendicular to each other and the optical center of the tilted surface K coincide with each other. It should be noted that the optical element 25A is not limited to one having a prismatic shape such as a dichroic prism, but a dichroic mirror having a parallel-plate shape can also be used.

The tilted surface K is provided with a polarization separation element 50A having wavelength selectivity. The polarization separation element 50A has a polarization separation function of separating the light beam bundle K1 having passed through the first wave plate 15 into the S-polarization component and the P-polarization component with respect to the polarization separation element 50A. Specifically, the polarization separation element 50A reflects the ray BLs of the S-polarization component out of the incident light (the light beam bundle K1) and transmits the ray BLp of the P-polarization component out of the incident light.

The ray BLs as the S-polarization component is reflected by the polarization separation element 50A and proceeds toward the fluorescence emitting element 27. The ray BLp as the P-polarization component is transmitted through the polarization separation element 50A and proceeds toward the diffusely reflecting element 30.

Further, the polarization separation element 50A has a color separation function of transmitting fluorescence YL described later and different in wavelength band from the light beam bundle K1 irrespective of the polarization state of the fluorescence YL.

The ray BLs as S-polarized light having been emitted from the polarization separation element 50A enters the first light collection optical system 26. The first light collection optical system 26 is for converging the ray BLs toward the phosphor layer 34 of the fluorescence emitting element 27. The first light collection optical system 26 is formed of, for example, pickup lenses 26a, 26b.

The ray BLs having been emitted from the first light collection optical system 26 enters the fluorescence emitting element 27. The fluorescence emitting element 27 has the phosphor layer 34, a substrate 35 for supporting the phosphor layer 34, and a fixation member 36 for fixing the phosphor layer 34 to the substrate 35.

In the fluorescence emitting element 27, the phosphor layer 34 is fixedly supported by the substrate 35 with the fixation member 36 disposed between a side surface of the phosphor layer 34 and the substrate 35 in the state in which the surface on the opposite side to the side, to which the ray BLs is input, of the phosphor layer 34 is made to have contact with the substrate 35.

The phosphor layer 34 includes phosphor particles for absorbing the ray BLs to convert the ray BLs into the yellow fluorescence YL, and then emitting the yellow fluorescence YL. As the phosphor particles, there can be used, for example, yttrium aluminum garnet (YAG) based phosphor. It should be noted that the constituent material of the phosphor particles can be unique, or it is also possible to use a mixture of the particles formed using two or more types of materials as the phosphor particles.

As the phosphor layer 34, a material superior in heat resistance and surface workability is preferably used. As such a phosphor layer 34, a phosphor layer obtained by dispersing phosphor particles in an inorganic binder such as alumina, or a phosphor layer obtained by sintering the phosphor particles without using the binder, for example, can preferably be used.

On the opposite side to the side, to which the ray BLs is input, of the phosphor layer 34, there is disposed a reflecting part 37. The reflecting part 37 has a function of reflecting a part of the fluorescence YL generated by the phosphor layer 34.

The reflecting part 37 is preferably formed of a specular surface. In the fluorescence emitting element 27, by specularly reflecting the fluorescence YL generated by the phosphor layer 34 with the reflecting part 37, it is possible to efficiently emit the fluorescence YL from the phosphor layer 34.

Specifically, the reflecting part 37 can be configured by disposing a reflecting film 37a on a surface on the side opposite to the side, to which the ray BLs is input, of the phosphor layer 34. In this case, the surface, which is opposed to the phosphor layer 34, of the reflecting film 37a forms the specular surface. The reflecting part 37 can also be realized by a configuration in which the substrate 35 is formed of a base material having a light reflective property. In this case, by eliminating the reflecting film 37a, and making a surface, which is opposed to the phosphor layer 34, of the substrate 35 specular, the surface can be used as the specular surface.

It is preferable to use an inorganic adhesive having a light reflective property as the fixation member 36. In this case, the light leaked from the side surface of the phosphor layer 34 can be reflected toward the inside of the phosphor layer 34 by the inorganic adhesive having the light reflective property. Thus, it is possible to further improve the light extraction efficiency of the fluorescence YL generated by the phosphor layer 34.

On a surface of the substrate 35 opposite to the surface for supporting the phosphor layer 34, there is disposed a heatsink 38. In the fluorescence emitting element 27, since heat radiation can be achieved through the heatsink 38, the heat deterioration of the phosphor layer 34 can be prevented.

A part of the fluorescence YL generated by the phosphor layer 34 is reflected by the reflecting part 37, and is then emitted to the outside of the phosphor layer 34. Further, another part of the fluorescence YL generated by the phosphor layer 34 is emitted to the outside of the phosphor layer 34 without the intervention of the reflecting part 37. In such a manner, the fluorescence YL is emitted from the phosphor layer 34 toward the first light collection optical system 26.

The fluorescence YL having been emitted from the phosphor layer 34 is transmitted through the first light collection optical system 26 and the polarization separation element 50A.

Meanwhile, the ray BLp as P-polarized light having been emitted from the polarization separation element 50A enters the second wave plate 28. The second wave plate 28 is formed of a quarter-wavelength plate (λ/4 plate) disposed in the light path between the polarization separation element 50A and the diffusely reflecting element 30. The ray BLp is transmitted through the second wave plate 28 to thereby be converted into a ray BLc' as circularly polarized light. The ray BLc' having been transmitted through the second wave plate 28 enters the second light collection optical system 29.

The second light collection optical system 29 is for converging the ray BLc' toward the diffusely reflecting element 30. The second light collection optical system 29 is formed of, for example, a pickup lens 29a and a pickup lens 29b.

The diffusely reflecting element 30 is for diffusely reflecting the ray BLc', which has been emitted from the second light collection optical system 29, toward the polarization separation element 50A. Among these elements, as the diffusely reflecting element 30, it is preferable to use an element for causing Lambertian reflection of the ray BLc' having entered the diffusely reflecting element 30.

The diffusely reflecting element 30 is provided with the diffusely reflecting plate 30A and a drive source 30M such as an electric motor for rotating the diffusely reflecting plate 30A. The rotary shaft of the drive source 30M is disposed roughly in parallel to the optical axis ax1. Thus, the diffusely reflecting plate 30A is configured so as to be rotatable in a plane crossing the principal ray of the ray BLc' entering the diffusely reflecting plate 30A. The diffusely reflecting plate 30A is formed to have, for example, a circular shape viewed from the direction of the rotary shaft.

The ray BLc' as the circularly polarized light reflected by the diffusely reflecting plate 30A and then transmitted again through the second light collection optical system 29 is transmitted again through the second wave plate 28, and turns to the ray BLs' as the S-polarized light.

The ray BLs' (blue light) having been emitted from the diffusely reflecting element 30 is combined with the fluorescence YL having been transmitted through the polarization separation element 50A, and thus white light WL having a white color is obtained. The white light WL enters the homogenous illumination optical system 40 (the first integrator optical system 31) shown in FIGS. 1 and 2. The first integrator optical system 31 homogenizes the illuminance distribution by the white light WL in the illumination target area in cooperation with the overlapping optical system 33.

The first integrator optical system 31 is formed of, for example, a lens array 31a and a lens array 31b. The lens arrays 31a, 31b are each formed of a component having a plurality of lenses arranged in an array.

The white light WL having passed through the first integrator optical system 31 enters the polarization conversion element 32. The polarization conversion element 32 is formed of, for example, a polarization separation film and a wave plate, and converts the white light WL into linearly polarized light.

The white light WL having passed through the polarization conversion element 32 enters the overlapping optical system 33. The overlapping optical system 33 is formed of, for example, an overlapping lens, and overlaps the white light WL having been emitted from the polarization conversion element 32 on the illumination target area. In the present embodiment, the illuminance distribution in the illumination target area is homogenized by the first integrator optical system 31 and the overlapping optical system 33.

As described hereinabove, according to the present embodiment, since the light having been emitted from the array light source 21 efficiently enters the fluorescence emitting element 27 or the diffusely reflecting element 30, the light use efficiency is high. Therefore, the illumination light high in brightness can be obtained. Therefore, according to the projector 1 of the present embodiment, one superior in display quality is obtained due to the illumination light high in brightness.

Second Embodiment

A homogenizer optical system according to a second embodiment will be described. It should be noted that configurations and members common to the embodiment described above and the present embodiment will be denoted by the same reference symbols, and the explanation thereof will be omitted, or simplified.

Figure 8A:
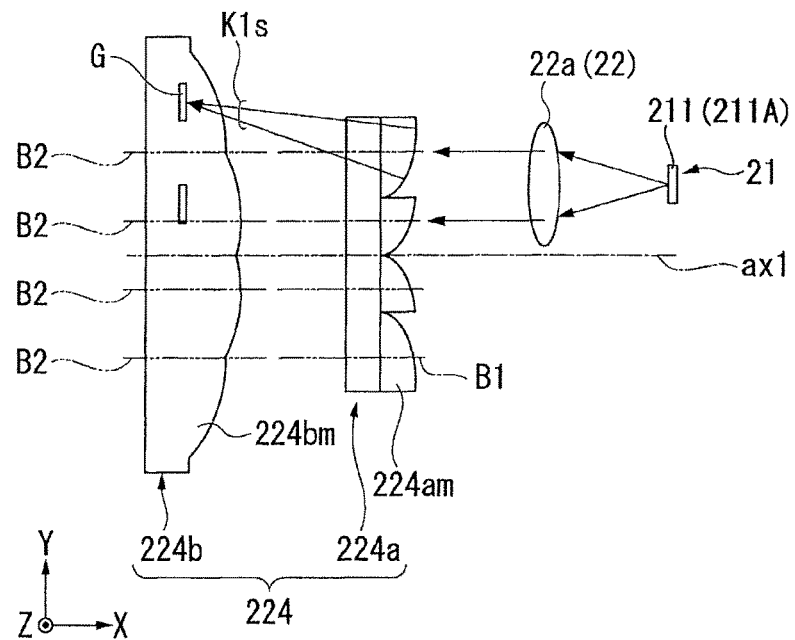
FIGS. 8A and 8B are configuration diagram of an essential part of a homogenizer optical system of a second embodiment of the invention.
Figure 8B:
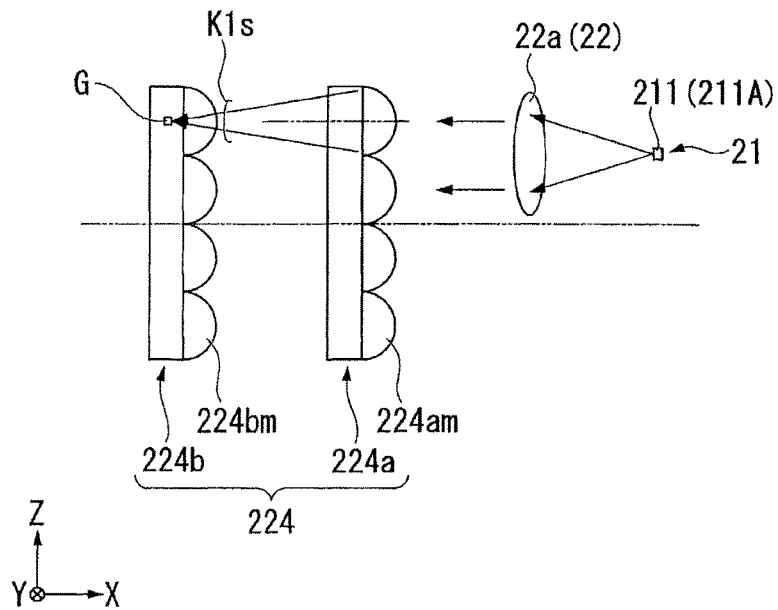

FIGS. 8A and 8B are diagrams showing a configuration of an essential part of the homogenizer optical system 224 of the present embodiment, wherein FIG. 8A is a plan view of the homogenizer optical system 224 viewed from the +Z direction, and FIG. 8B is a side view of the homogenizer optical system 224 viewed from the −Y direction.

The homogenizer optical system 224 of the present embodiment has a first lens array 224a and a second lens array 224b. The first lens array 224a includes a plurality of first small lenses 224am, and the second lens array 224b includes a plurality of second small lenses 224bm. It should be noted that the second lens array 224b has the same configuration as that of the second lens array 24b of the embodiment described above.

Also in the present embodiment, the size in the longitudinal direction (the Y direction) of the second small lens 224bm is arranged to be larger than the size in the Y direction of the first small lens 224am.

In the homogenizer optical system 224 of the present embodiment, an eccentric lens having an eccentric optical axis is used as the first small lens 224am. Specifically, the first small lens 224am has the optical axis B1 eccentrically disposed in the Y direction as shown in FIG. 8A. The eccentric direction of the optical axis B1 is set to a direction of getting away from the optical axis ax1 of the light emitted from the array light source 21.

The first small lens 224am has a deflection function similarly to the deflection prism 41 of the embodiment described above, and deflects the light K1s toward the direction (the Y direction or the −Y direction) of getting away from the optical axis ax1. It should be noted that the distance between the imaging position of the light K1s emitted from the first small lens 224am and the plane in which the plurality of first small lenses 224am is disposed does not change. The distance between the first lens array 224a and the second lens array 224b is adjusted so as not to disturb the conjugate relation existing between the first small lenses 224am and one of the fluorescence emitting element 27 and the diffusely reflecting element 30. In the present embodiment, each of the first small lenses 224am is designed to form the secondary light source image in the central part of the second small lens 224bm corresponding to the first small lens 224am having emitted the light K1s in the case of assuming that there is no mounting error.

Also in the present embodiment, the optical axis B1 of the first small lens 224am is located on the optical axis B2 of the second small lens 224bm. Thus, it is possible for the second small lens 224bm to convert the light K1s having been emitted from the first small lens 224am into parallel light and then emit the parallel light.

The longitudinal direction of the secondary light source image G formed on the second small lens 224bm and the longitudinal direction of the second small lens 224bm roughly coincide with each other. Further, the secondary light source image G is formed at a predetermined position, for example, the central part in the second small lens 224bm.

Also in the present embodiment, since the run-off of the secondary light source image G from the second small lens 224bm due to the mounting error is controlled, the light from the array light source 21 can efficiently be used. Therefore, high light use efficiency can be obtained.

Third Embodiment

A third embodiment will be described. It should be noted that configurations and members common to the embodiment described above and the present embodiment will be denoted by the same reference symbols, and the explanation thereof will be omitted, or simplified.

Projector

Firstly, an example of the projector 261 shown in FIG. 9 will be described.

Figure 9:
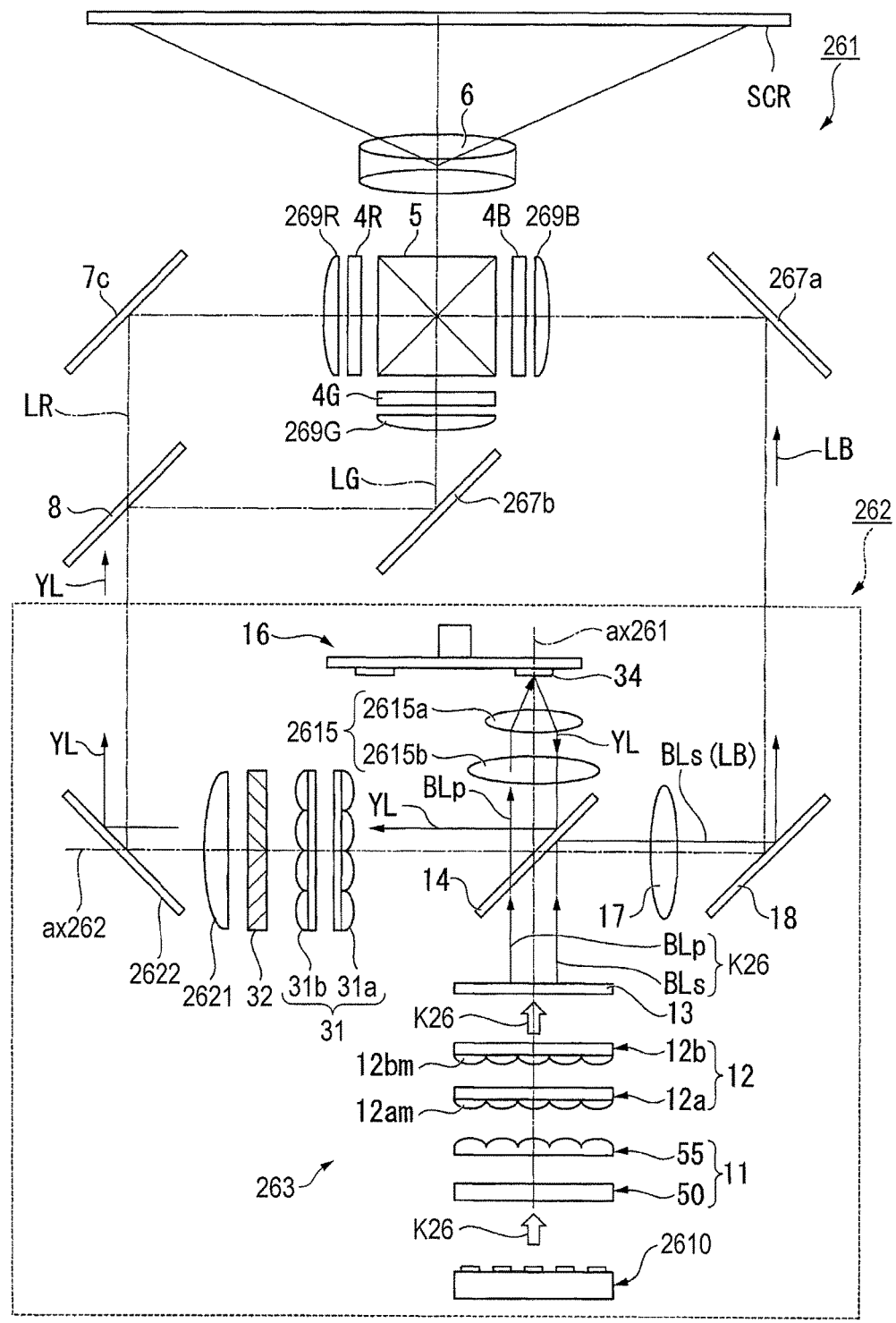
FIG. 9 is a plan view showing a general configuration of a projector.

FIG. 9 is a plan view showing a general configuration of the projector 261.

As shown in FIG. 9, the projector 261 is provided with an illumination device 262, a first total reflection mirror 267a, a second total reflection mirror 267b, a third total reflection mirror 7c, a dichroic mirror 8, the light modulation device 4R, the light modulation device 4G, the light modulation device 4B, the combining optical system 5, and the projection optical system 6.

The illumination device 262 emits the blue light LB as first illumination light, and yellow light YL as second illumination light.

The dichroic mirror 8 has a function of separating the yellow light YL from the illumination device 262 into the red light LR and the green light LG. The dichroic mirror 8 transmits the red light LR thus separated, and at the same time reflects the green light LG.

The first total reflection mirror 267a is disposed in the light path of the blue light LB, and reflects the blue light LB, which has been emitted from the illumination device 262, toward the light modulation device 4B.

The second total reflection mirror 267b is disposed in the light path of the green light LG, and reflects the green light LG thus separated toward the light modulation device 4G.

The third total reflection mirror 7c is disposed in the light path of the red light LR, and reflects the red light LR thus separated toward the light modulation device 4R.

On the incident side of the light modulation device 4R, the light modulation device 4G, and the light modulation device 4B, there are disposed a field lens 269R, a field lens 269G, and a field lens 269B, respectively.

Illumination Device

The illumination device 262 is provided with a light source device 263, a first integrator optical system 31, a polarization conversion element 32, a yellow-light overlapping lens 2621, and a total reflection mirror 2622. The light source device 263 is provided with a light source array 2610, a collimating optical system 11, a second integrator optical system 12, a wave plate 13, a polarization separation element 14, a pickup optical system 2615, a fluorescence emitting element 16, a blue-light overlapping lens 17, and a total reflection mirror 18. It should be noted that in the following explanation, the optical axis of the light source array 2610 is defined as an optical axis ax261. Further, an optical axis located in the same plane as the optical axis ax261 and perpendicular to the optical axis ax261 is defined as an optical axis ax262.

The light source array 2610, the collimating optical system 11, the second integrator optical system 12, the wave plate 13, the polarization separation element 14, the pickup optical system 2615, and a fluorescence emitting element 16 are arranged sequentially on the optical axis ax261.

The total reflection mirror 18, the blue-light overlapping lens 17, the polarization separation element 14, the first integrator optical system 31, the polarization conversion element 32, the yellow-light overlapping lens 2621, and the total reflection mirror 2622 are arranged sequentially on the optical axis ax262.

The light source array 2610 has a plurality of light emitting parts 2640.

Figure 10:
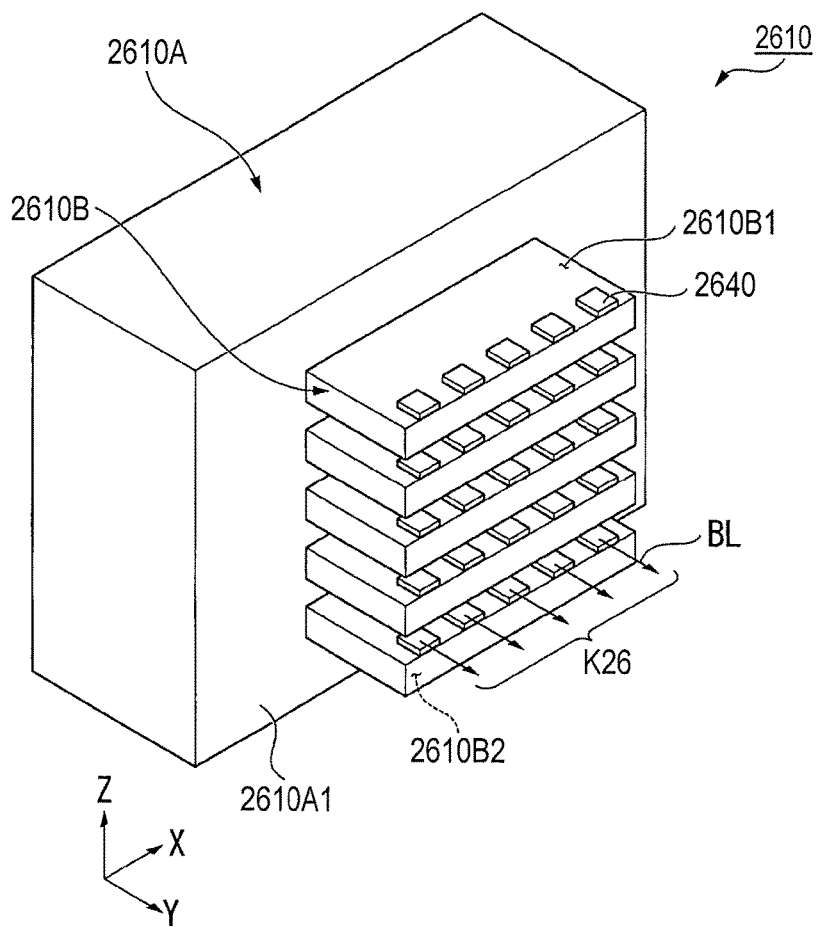
FIG. 10 is a perspective view showing a general configuration of a light source array.

FIG. 10 is a perspective view showing a general configuration of the light source array 2610. Hereinafter, in the description using the drawings, the explanation will be presented using the XYZ coordinate system. In FIG. 10, an arrangement direction of the light emitting parts 2640 is defined as the X direction, the direction of the principal ray of the light emitted from the light emitting parts 2640 is defined as the Y direction, and the direction perpendicular to the X direction and the Y direction is defined as the Z direction, wherein the Z direction is a vertical direction.

As shown in FIG. 10, the light source array 2610 is provided with a main body part 2610A, a plurality of support members 2610B, and the plurality of light emitting parts 2640 supported by the support members 2610B.

The main body parts 2610A and the support members 2610B are each formed of a metal material superior in heat radiation property such as aluminum or copper.

The plurality of support members 2610B is attached to a side surface 2610A1 of the main body section 2610A. The support members 2610B are arranged so as to have intervals equal to each other in the vertical direction of the side surface 2610A1.

Each of the support members 2610B is a plate-like member, and has an upper surface 2610B1 and a lower surface 2610B2. The planar shape of the upper surface 2610B1 and the lower surface 2610B2 is a roughly rectangular shape, and has long sides in the X direction, and short sides in the Y direction. The upper surface 2610B1 is parallel to the X-Y plane, and is a horizontal plane.

In the present embodiment, the light emitting parts 2640 are each formed of a semiconductor laser. The light emitting parts 2640 are mounted one-dimensionally on the upper surface 2610B1 of each of the support members 2610B. The direction in which the light emitting parts 2640 are arranged is defined as a first direction (the X direction). Each of the light emitting parts 2640 emits a ray BL formed of a blue light beam. The light source array 2610 emits a light beam bundle K26 including a plurality of rays BL.

In the present embodiment, one of the light emitting parts 2640 corresponds to a "first light emitting part" in the appended claims, and the ray BL emitted from one light emitting part 2640 corresponds to a "first light beam" in the appended claims. The support member 2610B corresponds to a "mounting board" in the appended claims, and the upper surface 2610B1 corresponds to a "mounting surface" in the appended claims.

Figure 11:
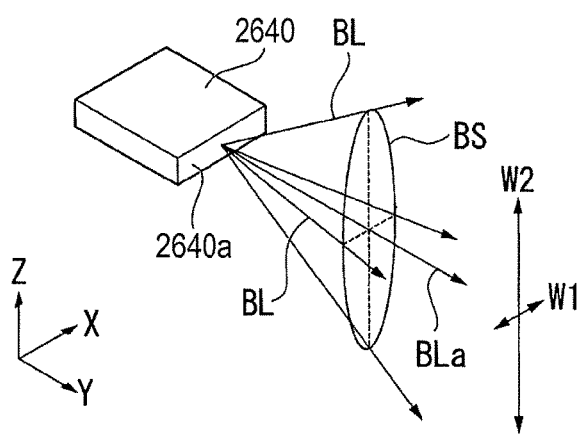
FIG. 11 is a diagram showing a configuration of an essential part of a light emitting part.

FIG. 11 is a diagram showing a configuration of an essential part of the light emitting part 2640.

As shown in FIG. 11, the light emitting part 2640 has a light emission surface 2640a for emitting light. The light emission surface 2640a has a roughly rectangular planar shape having a longitudinal direction W1 and a short-side direction W2 viewed from the direction of the principal ray of the light emitted. The light emission surface 2640a corresponds to a "light emission area" in the appended claims.

Here, the ratio between the width in the longitudinal direction W1 and the width in the short-side direction W2 of the light emission surface 2640a (hereinafter referred to as an aspect ratio in some cases) is preferably set to 30:1 or higher. In the present embodiment, the width in the longitudinal direction W1 of the light emission surface 2640a is, for example, 40 μm, and the width in the short-side direction W2 of the light emission surface 2640a is, for example, 1 μm, but the shape of the light emission surface 2640a is not limited thereto.

It should be noted that in FIG. 11, the longitudinal direction W1 is parallel to the X direction, and the short-side direction W2 is parallel to the Z direction.

The ray BL emitted from the light emitting part 2640 is formed of linearly polarized light having the polarization direction parallel to the longitudinal direction W1. The spread of the ray BL in the short-side direction W2 is larger than the spread of the ray BL in the longitudinal direction W1. In the present embodiment, the maximum value of the spread angle (the maximum emission angle) in the longitudinal direction W1 of the ray BL is, for example, 20°, and the maximum value of the spread angle (the maximum emission angle) in the short-side direction W2 is, for example, 70°.

Therefore, the cross-sectional shape BS of the ray BL becomes an elliptical shape having the long axis direction parallel to the Z direction (the short-side direction W2).

In the present embodiment, the plurality of light emitting parts 2640 is mounted on the upper surface 2610B1 so that the principal ray BLa of the ray BL emitted from each of the light emitting parts 2640 becomes parallel to the Y direction. In other words, the principal ray of the light beam bundle K26 is parallel to the upper surface 2610B1.

The light beam bundle K26 emitted from the light source array 2610 enters the collimating optical system 11.

As shown in FIG. 9, the collimating optical system 11 includes a first cylindrical lens array 50 and a second cylindrical lens array 55.

Figure 12:
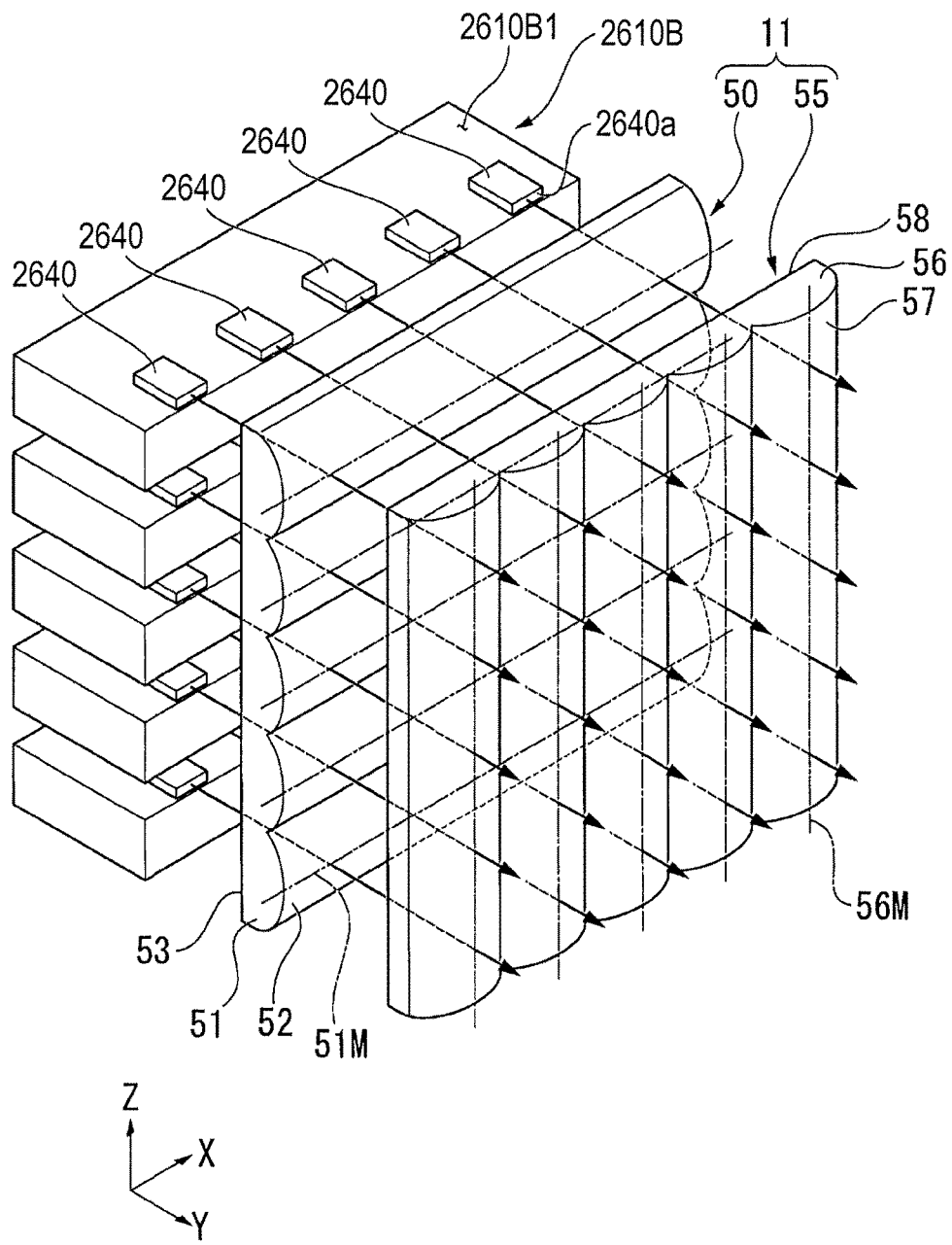
FIG. 12 is a perspective view showing a general configuration of a collimating optical system.

FIG. 12 is a perspective view showing a general configuration of the collimating optical system 11.

As shown in FIG. 12, the first cylindrical lens array 50 is disposed on the light source array 2610 side of the second cylindrical lens array 55. The first cylindrical lens array 50 includes a plurality of first cylindrical lenses 51. It should be noted that the first cylindrical lenses 51 can be formed integrally, or can be formed separately from each other.

The first cylindrical lenses 51 each have a first generatrix 51M along the X direction, a lens surface 52 having a convex shape, and a flat rear surface 53. The first generatrix 51M is parallel to the upper surface 2610B1.

In the present embodiment, since the first cylindrical lens 51 is a plano-convex lens, the manufacturing cost can be controlled.

In the present embodiment, the first cylindrical lenses 51 are arranged so that the rear surface 53 is opposed to the light emission surface 2640a of each the light emitting parts 2640. The number of the first cylindrical lenses 51 corresponds to the number of the support members 2610B.

As shown in FIG. 10, in the present embodiment, since there are disposed five support members 2610B, the first cylindrical lens array 50 is formed of five first cylindrical lenses 51.

Based on such a configuration, the ray BL emitted from the light emitting part 2640 is arranged to be collimated in the Y-Z plane by corresponding one of the first cylindrical lenses 51.

On the other hand, the second cylindrical lens array 55 includes a plurality of second cylindrical lenses 56. The second cylindrical lens array 55 includes a corresponding number of second cylindrical lenses 56 to the number of the light emitting parts 2640 mounted on each of the support members 2610B. It should be noted that the second cylindrical lenses 56 can be formed integrally, or can be formed separately from each other.

The second cylindrical lenses 56 are arranged so that the direction of a second generatrix 56M crosses the upper surface 2610B1 of the support member 2610B. In the present embodiment, the direction of the second generatrix 56M is perpendicular to the upper surface 2610B1. Further, second cylindrical lenses 56 each have the second generatrix 56M perpendicular to the direction of the first generatrix 51M of each of the first cylindrical lenses 51.

The second cylindrical lenses 56 are each a plano-convex lens having a lens surface 57 having a convex shape and a flat rear surface 58.

In the present embodiment, the second cylindrical lenses 56 are arranged so that the rear surface 58 is opposed to the lens surfaces 52 of the first cylindrical lenses 51. The number of the second cylindrical lenses 56 corresponds to the number of the light emitting parts 2640 arranged along the X direction of each of the upper surfaces 2610B1.

In the present embodiment, as shown in FIG. 12, since the five light emitting parts 2640 are arranged on the upper surface 2610B1 of the support member 2610B, the second cylindrical lens array 55 includes five second cylindrical lenses 56.

Based on such a configuration, it is arranged that the ray BL having been transmitted through the first cylindrical lens 51 is collimated in the X-Y plane by corresponding one of the second cylindrical lenses 56.

Figure 13A:
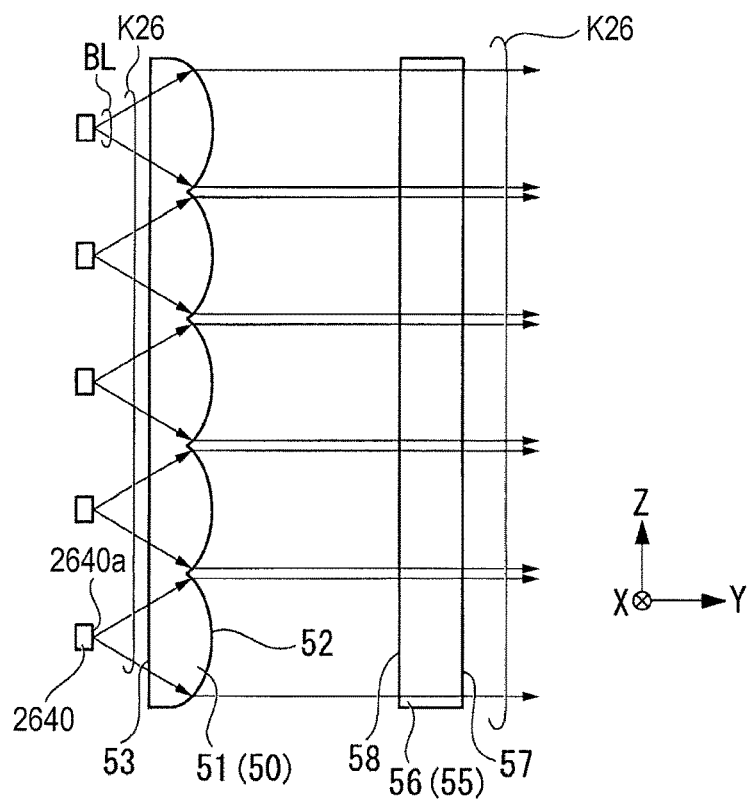
FIG. 13A is a side view of FIG. 12 viewed from the −X direction.
Figure 13B:
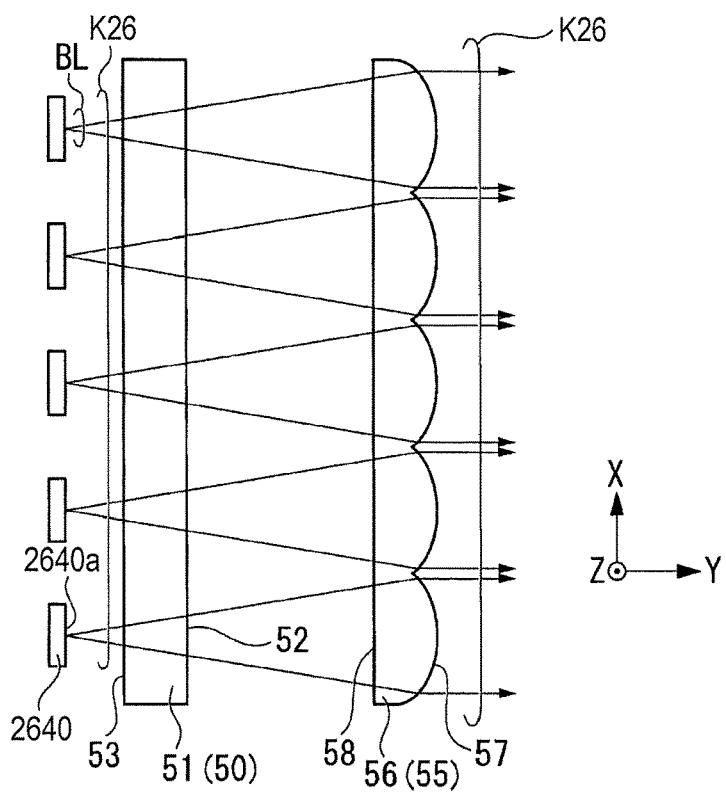
FIG. 13B is a plan view of FIG. 12 viewed from the +Z direction.

FIGS. 13A and 13B are diagrams for explaining the lens effect by the collimating optical system 11, wherein FIG. 13A is a side view of FIG. 12 viewed from the −X direction, and FIG. 13B is a plan view of FIG. 12 viewed from the +Z direction.

As shown in FIG. 13A, the first cylindrical lens 51 has the lens effect only in the plane parallel to the Y-Z plane perpendicular to the first generatrix 51M to thereby collimate the ray BL having been emitted from the light emitting part 2640 in the plane parallel to the Y-Z plane. In contrast, the first cylindrical lens 51 does not have the lens effect in a plane parallel to the X-Y plane parallel to the first generatrix 51M. Therefore, as shown in FIG. 13B, the ray BL is transmitted through the first cylindrical lens 51 without being subject to the lens effect in a plane parallel to the X-Y plane.

It should be noted that in the present embodiment, in the cross-section perpendicular to the first generatrix 51M of the first cylindrical lens 51, the cross-sectional shape of the lens surface 52 is aspheric. In the present embodiment, the cross-sectional shape described above is a shape with the conic constant KC approximated in $-1<KC<0$.

According to this configuration, since the spherical aberration can be corrected in good condition, even in the case in which the spread angle of the ray BL is large (70°), the collimation is achieved in good condition by the first cylindrical lenses 51.

As shown in FIG. 13A, since the second cylindrical lens 56 does not have the lens effect in a plane parallel to the Y-Z plane parallel to the second generatrix 56M, the ray BL is transmitted through the second cylindrical lens 56 without being subject to the lens effect in the plane parallel to the Y-Z plane. On the other hand, as shown in FIG. 13A, the second cylindrical lens 56 has the lens effect in the plane parallel to the X-Y plane perpendicular to the second generatrix 56M, and therefore collimates the ray BL having been transmitted through the first cylindrical lens 51 in the plane parallel to the X-Y plane.

In the present embodiment, the distance between the first cylindrical lens 51 and the second cylindrical lens 56, the refractive power of the first cylindrical lens 51, and the refractive power of the second cylindrical lens 56 are set so that the aspect ratio of the cross-section of the ray BL having been transmitted through the second cylindrical lens 56 is approximately 1. In other words, in the present embodiment, the cross-sectional shape BS of the ray BL having been transmitted through the collimating optical system 11 is not the elliptical shape shown in FIG. 11, but is a roughly circular shape.

As described above, according to the present embodiment, it is possible to convert the light beam bundle K26 emitted from the light source array 2610 into parallel light using the collimating optical system 11 including the two cylindrical lenses.

The light beam bundle K26 having been collimated by the collimating optical system 11 enters the second integrator optical system 12. The second integrator optical system 12 includes a first lens array 12a and a second lens array 12b. The first lens array 12a includes a plurality of first small lenses 12am, and the second lens array 12b includes a plurality of second small lenses 12bm. The second small lenses 12bm correspond respectively to the first small lenses 12am.

The first lens array 12a and the fluorescence emitting element 16 are optically conjugate with each other, and the first lens array 12a and the light modulation device 4B are optically conjugate with each other. Further, the light emission surface 2640a of the light emitting part 2640 and the second lens array 12b are optically conjugate with each other.

The second integrator optical system 12 homogenizes the illuminance distribution (the brightness) of the light, with which the fluorescence emitting element 16 is irradiated, in cooperation with the pickup optical system 2615 as described later. Further, the second integrator optical system 12 homogenizes the illuminance distribution of the light in the image forming area of the light modulation device 4B in cooperation with the blue-light overlapping lens 17 as described later.

Incidentally, in the illumination device 262 having the light source array 2610 provided with the plurality of light emitting parts 2640 as in the present embodiment, it is inevitable that some displacement occurs in the alignment of the light emitting parts 2640. In other words, in the present embodiment, the illumination device 262 is arranged to have some mounting error.

Here, the configuration of the present embodiment will be described with reference to the homogenizer optical system 112 including a first lens array 112a and a second lens array 112b disposed in the subsequent stage of the first lens array 112a as a comparative example.

Figure 14:
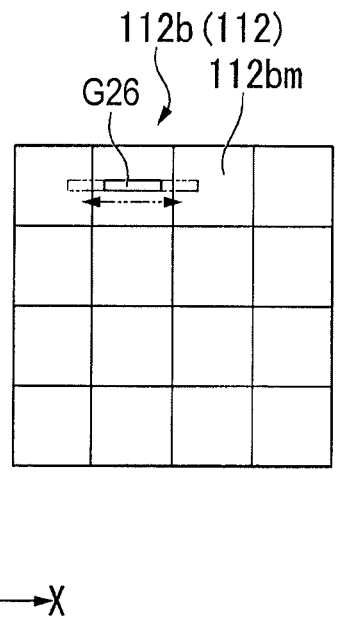
FIG. 14 is a plan view of a second lens array according to a comparative example viewed from the +Y direction.

FIG. 14 is a plan view of a second lens array 112b according to the comparative example viewed from the +Y direction.

If the mounting error described above occurs in the light source array 2610, the homogeneity of the illuminance distribution on the phosphor layer 34 degrades. This is because the position of a secondary light source image G26 formed on the second small lens 112bm by the ray BL emitted from one light emitting part 2640 is shifted from a predetermined position of the second small lens 112bm, for example, the center of the second small lens 112bm.

Since the light emission surface 2640a of the light emitting part 2640 and the second lens array 112b are optically conjugate with each other, in the case in which the light emission surface 2640a has a rectangular shape having the longitudinal direction in the X direction, the secondary light source image G26 formed on the second small lens 112bm becomes to have a rectangular shape having the longitudinal direction in the X direction.

Here, the displacement of the secondary light source image G26 on the second small lens 112bm due to the mounting error occurs in every direction at the same rate. The planar shape of the second small lens 112bm is a square shape having the length in the X direction equal to the length in the Z direction.

If the mounting error occurs, the secondary light source image G26 is shifted from the predetermined position. It should be noted that in the present embodiment, the plurality of light emitting parts 2640 is mounted on the upper surface 2610B1 (a horizontal surface) of each of the support members 2610B. Therefore, in the plurality of light emitting parts 2640, the mounting error in the height direction (the Z direction) perpendicular to the upper surface 2610B1 is difficult to occur. However, there is a possibility that the mounting positions of the light emitting parts 2640 are shifted in the X direction in the upper surface 2610B1. In this case, the secondary light source image G26 is also shifted in the X direction.

As is understood from FIG. 14, there is a possibility that the secondary light source image G26 shifted in the X direction runs off the second small lens 112bm. The predetermined illumination target area cannot be irradiated with the component running off the second small lens 112bm out of the secondary light source image G26. Therefore, if the secondary light source image G26 runs off, the light beam bundle K26 emitted from the light source array 2610 cannot efficiently be used, and the light use efficiency degrades.

Here, in the case in which the aspect ratio of the light emission surface 2640a of the light emitting part 2640 is, for example, 30:1 or higher, since the secondary light source image G26 has a shape elongated in the longitudinal direction, the secondary light source image G26 is easy to run off the second small lens 112bm.

In order to solve this problem, the illumination device 262 according to the present embodiment is provided with the second integrator optical system 12 including the second small lenses 12bm each having a rectangular shape.

Figure 15:
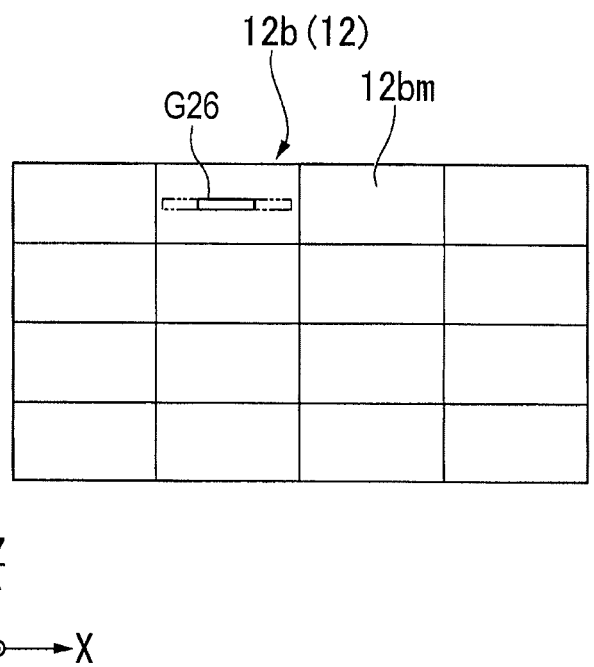
FIG. 15 is a plan view of a second lens array viewed from the +Y direction.

FIG. 15 is a plan view of the second lens array 12b viewed from the +Y direction.

As shown in FIG. 15, the planar shape of the second small lens 12bm of the second lens array 12b is a rectangular shape having the longitudinal direction along the X direction. Therefore, even if the secondary light source image G26 is shifted in the X direction due to the mounting error caused in the light emitting parts 2640, the secondary light source image G26 is difficult to run off the second small lens 12bm.

Therefore, the light beam bundle K26 emitted from the light source array 2610 can efficiently be used. Further, since the mounting accuracy of the light emitting parts 2640 required in the light source array 2610 decreases, manufacturing becomes easier, and cost reduction can be achieved.

Further, according to the present embodiment, even in the case in which the aspect ratio of the light emission surface 2640a is, for example, as high as 30:1 or higher, and the run-off of the secondary light source image G26 is easy to occur in the related art, the run-off of the secondary light source image G26 can be reduced. The higher the aspect ratio of the light emission surface 2640a is, the more prominent effect the invention exerts.

The first cylindrical lenses 51 have the refractive power in a direction perpendicular to the upper surface 2610B1, and the second cylindrical lenses 56 have the refractive power in another direction. Further, since the second cylindrical lenses 56 are disposed in the subsequent stage of the first cylindrical lenses 51, the focal distance of the second cylindrical lenses 56 is longer than the focal distance of the first cylindrical lenses 51. Therefore, even in the case in which the mounting error of the light emitting parts 2640 occurs in the first direction, the influence of the mounting error is relatively small.

It should be noted that in order to improve the effect of the second integrator optical system 12, it is necessary to make the ray BL efficiently enter the first small lenses 12am of the first lens array 12a. This is because the illuminance distribution in the illumination area is homogenized by overlapping the light having entered each of the first small lenses 12am each other on the illumination area.

Figure 16:
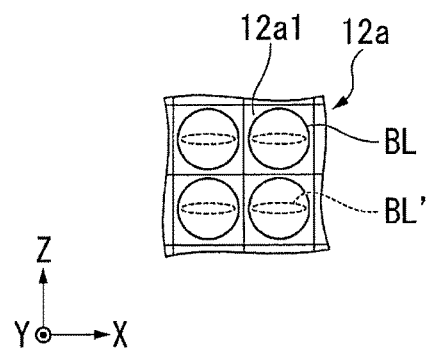
FIG. 16 is a diagram conceptually showing a plane of incidence of light of a first lens array.

FIG. 16 is a diagram conceptually showing the plane of incidence of light of the first lens array 12a. It should be noted that in FIG. 16, the ray BL' of the case in which the aspect ratio is lower than 1 is shown as the comparison.

In the present embodiment, as described above, the aspect ratio of the cross-sectional shape BS of the ray BL emitted from the collimating optical system 11 is set to approximately 1.

As shown in FIG. 16, the ray BL, the aspect ratio of the cross-sectional shape of which is approximately 1, is larger in incident area to the first small lens 12am than the ray BL', the aspect ratio of the cross-sectional shape of which is lower than 1. Therefore, according to the present embodiment, it is possible to improve the light overlapping performance of the second integrator optical system 12.

Further, since the ray BL has the aspect ratio of approximately 1, and is large in area, it is possible to illuminate the illumination target area with high homogeneity without decreasing the sizes of the first small lenses 12am. In other words, since the number of the first small lenses 12am constituting the first lens array 12a can be decreased, manufacturing is easy, and thus, the cost of the first lens array 12a can be reduced.

Therefore, according to the present embodiment, by setting the aspect ratio of the ray BL to approximately 1, it is possible to illuminate the illumination target area with high homogeneity using the second integrator optical system 12 low in cost.

The light beam bundle K26 having been transmitted through the second integrator optical system 12 enters the wave plate 13.

The wave plate 13 is, for example, a half-wavelength plate arranged to be able to rotate. By appropriately setting the rotational angle of the half-wavelength plate, it is possible to set the light beam bundle K26 having been transmitted through the wave plate 13 to the light including the S-polarization component and the P-polarization component with respect to the polarization separation element 14 at a predetermined ratio.

The polarization separation element 14 is disposed so as to form an angle of 45° with respect to each of the optical axis ax261 and the optical axis ax262. The polarization separation element 14 is formed of, for example, a polarization beam splitter, and has a polarization separation function of separating the light beam bundle K26 having passed through the wave plate 13 into the S-polarization component and the P-polarization component with respect to the wave plate 13. Further, the polarization separation element 14 has a color separation function of transmitting the yellow light YL formed of the fluorescence described later and different in wavelength band from the light beam bundle K26 irrespective of the polarization state of the yellow light YL.

Specifically, the polarization separation element 14 reflects the ray BLs of the S-polarization component out of the incident light (the light beam bundle K26) and transmits the ray BLp of the P-polarization component out of the incident light.

The ray BLs as the S-polarization component is reflected by the polarization separation element 14 and proceeds toward the blue-light overlapping lens 17. The ray BLp as the P-polarization component is transmitted through the polarization separation element 14 and proceeds toward the fluorescence emitting element 16.

The ray BLs as S-polarized light having been emitted from the polarization separation element 14 enters the blue-light overlapping lens 17. The blue-light overlapping lens 17 overlaps the ray BLs with the image forming area of the light modulation device 4B as the blue light LB in cooperation with the second integrator optical system 12 to thereby homogenize the illuminance distribution of the blue light LB. Specifically, the ray BLs having been transmitted through the blue-light overlapping lens 17 enters the light modulation device 4B as the blue light LB via the total reflection mirrors 18, 267a, and the field lens 269B.

According to the present embodiment, since the second integrator optical system 12 is provided with the second small lenses 12bm each having a rectangular shape, it is possible to efficiently irradiate the image forming area of the light modulation device 4B with the blue light LB having the homogenous luminance.

Meanwhile, the ray BLp as the P-polarization component is transmitted through the polarization separation element 14 and then enters the pickup optical system 2615. The pickup optical system 2615 is provided with a function of collecting the ray BLp on the phosphor layer 34 of the fluorescence emitting element 16, and a function of picking up the fluorescence emitted from the phosphor layer 34. The pickup optical system 2615 is formed of, for example, pickup lenses 2615a, 2615b.

The pickup optical system 2615 overlaps the ray BLp on the phosphor layer 34 of the fluorescence emitting element 16 in cooperation with the second integrator optical system 12. In the present embodiment, since the second integrator optical system 12 is provided with the second small lenses 12*bm* each having a rectangular shape, it is possible to efficiently irradiate the phosphor layer 34 with the ray BLp having the homogenous luminance as the excitation light.

Figure 17A:
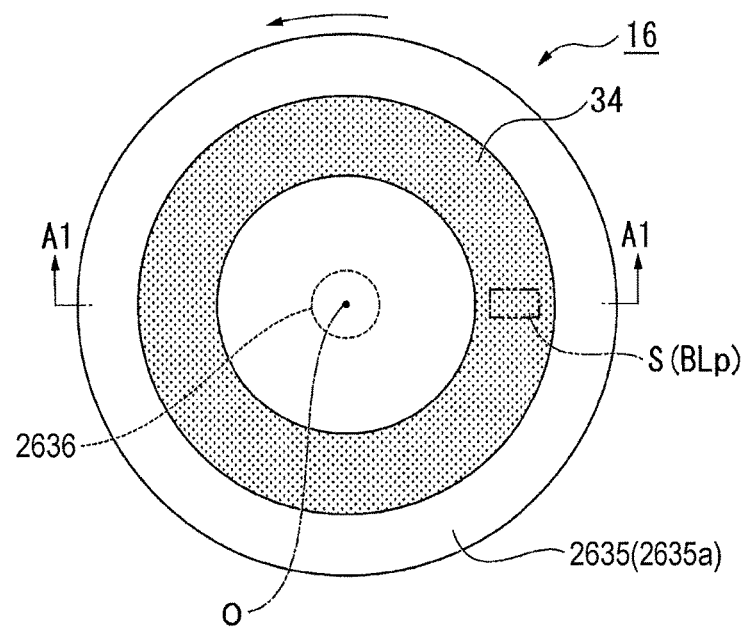
FIG. 17A is a front view of a fluorescence emitting element.
Figure 17B:
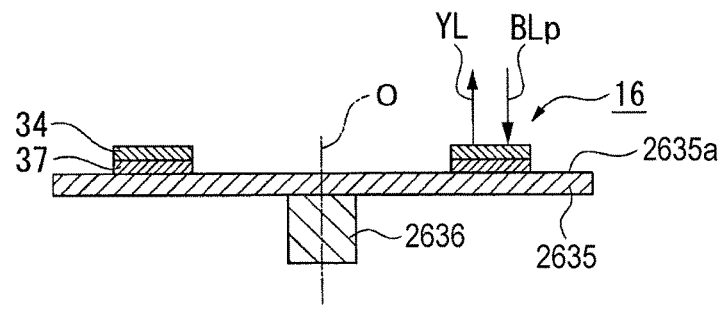
FIG. 17B is a cross-sectional view of FIG. 17A viewed along the arrowed line A1-A1.

FIGS. 17A and 17B are diagrams showing a general configuration of the fluorescence emitting element 16. FIG. 17A is a front view of the fluorescence emitting element 16, and FIG. 17B is a cross-sectional view of FIG. 17A viewed along the arrowed line A1-A1.

As shown in FIG. 17A, the fluorescence emitting element 16 includes the phosphor layer 34, a circular disk 2635 for supporting the phosphor layer 34, and a drive section 2636. The circular disk 2635 can rotate around the rotational axis O due to the drive section 2636. The circular disk 2635 is formed of a circular disk made of metal superior in radiation performance such as aluminum or copper. The phosphor layer 34 is disposed on the upper surface 2635*a* of the circular disk 2635 along the circumferential direction of the circular disk 2635. The drive section 2636 is formed of a drive source such as an electric motor.

The phosphor layer 34 includes phosphor particles for absorbing the ray BLp to convert the ray BLp into the yellow light YL formed of fluorescence, and then emitting the yellow light YL. As the phosphor particles, there can be used, for example, yttrium aluminum garnet (YAG) based phosphor. It should be noted that the constituent material of the phosphor particles can be unique, or it is also possible to use a mixture of the particles formed using two or more types of materials as the phosphor particles.

As the phosphor layer 34, a material superior in heat resistance and surface workability is preferably used. As such a phosphor layer 34, a phosphor layer obtained by dispersing phosphor particles in an inorganic binder such as alumina, or a phosphor layer obtained by sintering the phosphor particles without using the binder, for example, can preferably be used.

Incidentally, when the phosphor particles absorb the ray BLp formed of a laser beam and thus the temperature of the phosphor layer 34 excessively rises, a phenomenon called thermal quenching occurs, and the luminous efficiency of the phosphor particles decreases.

According to the present embodiment, since the phosphor layer 34 is irradiated with the ray BLp homogenized by the second integrator optical system 12 described above, the temperature of the phosphor layer 34 is prevented from excessively rising. Therefore, the luminous efficiency is difficult to degrade.

Therefore, according to the present embodiment, the degradation of the luminous efficiency of the yellow light YL can be reduced.

On the opposite side to the side, to which the ray BLp is input, of the phosphor layer 34, there is disposed the reflecting part 37. The reflecting part 37 reflects the yellow light YL generated in the phosphor layer 34 toward the pickup optical system 2615.

Further, as described above, the first lens array 12*a* and the fluorescence emitting element 16 are optically conjugate with each other, and the first lens array 12*a* and the light modulation device 4B are optically conjugate with each other. Therefore, a spot S formed by the ray BLp on the phosphor layer 34 and a spot formed on the light modulation device 4B are similar to each other. In other words, the aspect ratio of the spot S formed by the ray BLp on the phosphor layer 34 is arranged to be roughly equal to the aspect ratio of the image forming area of the light modulation device 4B.

In the present embodiment, the long-side direction of the spot S described above coincides with the radial direction of the circular disk 2635. Since the circular disk 2635 rotates, the spot S moves relatively on the phosphor layer 34 in the short-side direction of the spot S. Therefore, the amount of light of the ray BLp entering a predetermined part of the phosphor layer 34 per unit time (per time for the circular disk 2635 to rotate one revolution) is smaller than in the case in which the short-side direction of the spot S described above is made to coincide with the radial direction of the circular disk 2635.

Thus, since the rise in temperature of the phosphor layer 34 is reduced, the thermal quenching is difficult to occur, and it is possible for the phosphor layer 34 to efficiently generate the yellow light YL.

The yellow light YL having been emitted from the phosphor layer 34 is converted into parallel light by the pickup optical system 2615, and is then reflected by the polarization separation element to thereby enter the first integrator optical system 31.

The first integrator optical system 31 homogenizes the illuminance distribution by the yellow light YL in the illumination target area in cooperation with the yellow-light overlapping lens 2621.

The first integrator optical system 31 is formed of, for example, the lens array 31*a* and the lens array 31*b*. The lens arrays 31*a*, 31*b* are each formed of a component having a plurality of lenses arranged in an array.

The yellow light YL having passed through the first integrator optical system 31 enters the polarization conversion element 32. The polarization conversion element 32 is formed of, for example, the polarization separation film and the wave plate, and converts the yellow light YL into linearly polarized light.

The yellow light YL having passed through the polarization conversion element 32 enters the yellow-light overlapping lens 2621. The yellow-light overlapping lens 2621 makes the yellow light YL emitted from the polarization conversion element 32 overlap the illumination target area. In the present embodiment, the illuminance distribution in the illumination target area is homogenized by the first integrator optical system 31 and the yellow-light overlapping lens 2621.

Specifically, the yellow light YL having been emitted from the yellow-light overlapping lens 2621 is reflected by the total reflection mirror 2622, and is then separated by the dichroic mirror 8 into the red light LR and the green light LG. The red light LR is transmitted through the dichroic mirror 8, and then illuminates the image forming area of the light modulation device 4R with homogenous luminance via the third total reflection mirror 7*c* and the field lens 269R.

Further, the green light LG is reflected by the dichroic mirror 8 and the second total reflection mirror 267*b*, and then illuminates the image forming area of the light modulation device 4G with homogenous luminance via the field lens 269G.

As described hereinabove, according to the present embodiment, since the light having been emitted from the light source array 2610 efficiently enters the fluorescence emitting element 16 or the light modulation device 4B, the light use efficiency is improved. Therefore, the illumination light high in brightness can be obtained. Therefore, according to the projector 261 of the present embodiment, one superior in display quality is obtained due to the illumination light high in brightness.

It should be noted that the invention is not necessarily limited to the embodiments described above, but a variety of modifications can be added thereto within the scope or the spirit of the invention.

For example, although in the first embodiment, the case of disposing the deflection prisms 41 on the light emission side of the first small lenses 24am is cited as an example, it is also possible to dispose the deflection prisms 41 on the light incident side of the first small lenses 24am.

In the third embodiment, the direction of the first generatrix 51M and the direction of the second generatrix 56M are not necessarily required to be perpendicular to each other.

In each of the embodiments described above, the case in which the longitudinal direction of the light emission area and the longitudinal direction of the second small lens coincide with each other is cited as an example, but the invention is not limited to this example. Specifically, it is sufficient for the longitudinal direction of the light emission area to cross the short-side direction of the second small lens. In other words, it is sufficient for the longitudinal direction of the light emission area and the short-side direction of the second small lens not to coincide with each other.

Although in each of the embodiments described above, there is illustrated the projector provided with the three light modulation devices 4R, 4G, and 4B, the invention can also be applied to a projector for displaying a color picture using a single light modulation device. Further, the light modulation device is not limited to the liquid crystal panel described above, but a digital mirror device, for example, can also be used.

Besides the above, the shape, the number, the arrangement, the material, and so on of the variety of constituents of the illumination device and the projector are not limited to those of the embodiments described above, but can arbitrarily be modified.

Further, although in each of the embodiments described above, there is described the example of mounting the illumination device according to the invention in the projector, the invention is not limited to the example. The illumination device according to the invention can also be applied to lighting equipment, a headlight of a vehicle, and so on.

The entire disclosure of Japanese Patent Application No.: 2015-123750, filed on Jun. 19, 2015 and 2015-148282, filed on Jul. 28, 2015 are expressly incorporated by reference herein.

What is claimed is:

1. A light source device comprising:
   a light source array including at least one semiconductor laser;
   a collimating optical system, to which a light beam bundle emitted from the light source array is input;
   a first lens array including a plurality of first small lenses, to which the light beam bundle having been transmitted through the collimating optical system is input;
   a second lens array disposed in a subsequent stage of the first lens array, and including a plurality of second small lenses corresponding respectively to the first small lenses;
   a light collection optical system disposed in a subsequent stage of the second lens array; and
   a scattered light generation part which is disposed in a subsequent stage of the light collection optical system, and in which the light beam bundle is input; and
   a deflection prism disposed on one of a light incident side and a light emission side of the first lens array,
   wherein a planar shape of a light emission area of one of the at least one semiconductor laser has a short-side direction and a longitudinal direction,
   a planar shape of one of the second small lenses has a longitudinal direction,
   a planar shape of the first small lenses is square such that the planar shape of the first small lens and the planar shape of the second small lens are different from each other,
   the short-side direction of the light emission area crosses the longitudinal direction of the second small lens, and
   wherein a size of the second small lens in the longitudinal direction is larger than a size of a first small lens out of the plurality of first small lenses in the longitudinal direction, the first small lens corresponding to the second small lens.

2. The light source device according to claim 1, wherein the at least one semiconductor laser includes a plurality of semiconductor lasers,
   the light source array further includes a mounting board having a mounting surface on which the plurality of semiconductor lasers is mounted,
   the semiconductor lasers are mounted along a first direction parallel to the mounting surface so that a principal ray of the light beam bundle is emitted from the light source array in parallel to the mounting surface,
   the longitudinal direction of each of the semiconductor lasers coincides with the first direction, and
   the longitudinal direction of the second small lens is parallel to the mounting surface.

3. An illumination device comprising:
   the light source device according to claim 2; and
   a homogenous illumination optical system to which light emitted from the light source device is input.

4. The light source device according to claim 1, wherein a deflection direction by the deflection prism of the light emitted from the semiconductor laser is the longitudinal direction of the second small lens, and
   the deflection direction is a direction of getting away from an optical axis of the light beam bundle.

5. The light source device according to claim 1, wherein the deflection prism has a strip shape elongated in a direction perpendicular to the longitudinal direction of the second small lens.

6. The light source device according to claim 1, wherein an optical axis of one of the first small lenses is eccentrically disposed in the longitudinal direction of the second small lens, and
   the eccentric direction is a direction of getting away from an optical axis of the light beam bundle.

7. The light source device according to claim 1, wherein an optical axis of the second small lens is eccentrically disposed in the longitudinal direction of the second small lens, and
   the eccentric direction is a direction of getting closer to an optical axis of the light beam bundle.

8. The light source device according to claim 7, wherein wherein a center of the first small lens corresponding to the second small lens out of the plurality of first small lenses is located on an optical axis of the second small lens.

9. An illumination device comprising:
the light source device according to claim 1; and
a homogenous illumination optical system to which light emitted from the light source device is input.

10. A projector comprising:
a light modulation device according to claim 9;
a light modulation device adapted to modulate light, in accordance with image information, emitted from the illumination device to thereby form image light; and
a projection optical system adapted to project the image light.

11. A light source device comprising:
a light source array including at least one semiconductor laser;
a collimating optical system, to which a light beam bundle emitted from the light source array is input;
a first lens array including a plurality of first small lenses, to which the light beam bundle having been transmitted through the collimating optical system is input; and
a second lens array disposed in a subsequent stage of the first lens array, and including a plurality of second small lenses corresponding respectively to the first small lenses, wherein:
a planar shape of a light emission area of one of the at least one semiconductor laser has a short-side direction and a longitudinal direction,
a planar shape of one of the second small lenses has a longitudinal direction,
the short-side direction of the light emission area crosses the longitudinal direction of the second small lens,
the at least one semiconductor laser includes a plurality of semiconductor lasers,
the light source array further includes a mounting board having a mounting surface on which the plurality of semiconductor lasers is mounted,
the semiconductor lasers are mounted along a first direction parallel to the mounting surface so that a principal ray of the light beam bundle is emitted from the light source array in parallel to the mounting surface,
the longitudinal direction of each of the semiconductor lasers coincides with the first direction,
the longitudinal direction of the second small lens is parallel to the mounting surface,
the collimating optical system includes a first cylindrical lens and a second cylindrical lens disposed in a subsequent stage of the first cylindrical lens,
the first cylindrical lens has a first generatrix,
the second cylindrical lens has a second generatrix,
the first generatrix is parallel to the mounting surface, and
a direction of the second generatrix crosses the mounting surface.

12. The light source device according to claim 11, wherein
the light beam bundle includes a light beam emitted from one of the semiconductor lasers, and
a distance between the first cylindrical lens and the second cylindrical lens, a refractive power of the first cylindrical lens, and a refractive power of the second cylindrical lens are set so that an aspect ratio of a cross-section of the light beam having been transmitted through the second cylindrical lens is approximately 1.

13. An illumination device comprising:
the light source device according to claim 12; and
a homogenous illumination optical system to which light emitted from the light source device is input.

14. The light source device according to claim 11, wherein
a cross-sectional shape of the first cylindrical lens, perpendicular to the first generatrix, is aspheric.

15. The light source device according to claim 14, wherein
the cross-sectional shape is a shape with a conic constant KC approximated in −1<KC<0.

16. An illumination device comprising:
the light source device according to claim 14; and
a homogenous illumination optical system to which light emitted from the light source device is input.

17. An illumination device comprising:
the light source device according to claim 11; and
a homogenous illumination optical system to which light emitted from the light source device is input.

18. An illumination device comprising:
the light source device according to claim 15; and
a homogenous illumination optical system to which light emitted from the light source device is input.

* * * * *